(12) United States Patent
Kimura et al.

(10) Patent No.: US 11,940,086 B2
(45) Date of Patent: Mar. 26, 2024

(54) TABLE ROTATION DEVICE AND MACHINE TOOL

(71) Applicant: Yamazaki Mazak Corporation, Niwa-gun (JP)

(72) Inventors: Jojiro Kimura, Niwa-gun (JP); Makoto Tahara, Niwa-gun (JP); Nobuhiro Sakai, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 156 days.

(21) Appl. No.: 17/746,960

(22) Filed: May 18, 2022

(65) Prior Publication Data
US 2022/0275903 A1 Sep. 1, 2022

Related U.S. Application Data

(63) Continuation of application No. PCT/JP2019/045432, filed on Nov. 20, 2019.

(51) Int. Cl.
*F16M 11/00* (2006.01)
*F16C 19/16* (2006.01)
*F16M 1/04* (2006.01)

(52) U.S. Cl.
CPC ............... *F16M 1/04* (2013.01); *F16C 19/16* (2013.01)

(58) Field of Classification Search
CPC ..... F16M 1/04; F16C 19/16; B23Q 2220/004; B23Q 11/127; B23Q 1/52
See application file for complete search history.

(56) References Cited

U.S. PATENT DOCUMENTS

| 5,239,892 | A | 8/1993 | Sakai | |
|---|---|---|---|---|
| 9,895,784 | B2 * | 2/2018 | Shirai | B23Q 11/127 |
| 10,744,610 | B2 * | 8/2020 | Keibach | B23Q 11/126 |
| 2008/0302208 | A1 | 12/2008 | Yonenaga | |
| 2009/0235783 | A1 | 9/2009 | Duane et al. | |
| 2009/0308285 | A1 * | 12/2009 | Bode | F16C 32/044 310/90.5 |

(Continued)

FOREIGN PATENT DOCUMENTS

| CN | 101323092 | 12/2008 |
|---|---|---|
| CN | 101959640 | 1/2011 |

(Continued)

OTHER PUBLICATIONS

The International Preliminary Report on Patentability (Chapter I) with translation of Written Opinion for corresponding International Application No. PCT/JP2019/045432, dated Jun. 2, 2022.

(Continued)

*Primary Examiner* — Amy J. Sterling
(74) *Attorney, Agent, or Firm* — MORI & WARD, LLP

(57) ABSTRACT

A table rotation device includes a bearing assembly, a table support member, a support block, and a cooling block. The bearing assembly includes a fixed ring, a movable ring, and rolling elements provided between the fixed ring and the movable. The movable ring is rotatable about the rotation axis. The table support member is connected to the movable ring so as to fix a position of the table support member relative to a position of the movable ring. The support block is connected to the fixed ring so as to fix a position of the support block relative to a position of the fixed ring. The cooling block is connected to at least one of the fixed ring and the support block such that the cooling block is in contact with both the fixed ring and the support block. The cooling block provides a cooling passage.

20 Claims, 16 Drawing Sheets

(56) References Cited

U.S. PATENT DOCUMENTS

| | | | |
|---|---|---|---|
| 2011/0001282 A1 | 1/2011 | Taniguchi et al. | |
| 2018/0133857 A1* | 5/2018 | Keibach | B23Q 11/126 |
| 2021/0129280 A1 | 5/2021 | Takahashi | |

FOREIGN PATENT DOCUMENTS

| | | |
|---|---|---|
| CN | 104858673 | 8/2015 |
| CN | 205129401 U | 4/2016 |
| CN | 107848089 | 3/2018 |
| CN | 110248770 | 9/2019 |
| GB | 2248893 | 4/1992 |
| JP | 04-289042 | 10/1992 |
| JP | 2016-78172 | 5/2016 |
| JP | 2019-176551 | 10/2019 |
| WO | WO 2009/107493 | 9/2009 |

OTHER PUBLICATIONS

International Search Report for corresponding International Application No. PCT/JP2019/045432, dated Jan. 28, 2020.
Written Opinion for corresponding International Application No. No. PCT/JP2019/045432, dated Jan. 28, 2020.
Japanese Office Action for corresponding JP Application No. 2020-505511, dated May 19, 2020 (w/ English machine translation).
Supplementary European Search Report for corresponding EP Application No. 19953184.9-1103, dated Oct. 24, 2022.
Chinese Office Action for corresponding CN Application No. 201980102150.4, dated Oct. 28, 2022.

* cited by examiner

TABLE ROTATION DEVICE AND MACHINE TOOL

CROSS-REFERENCE TO RELATED APPLICATIONS

The present application is a continuation application of International Application No. PCT/JP2019/045432, filed Nov. 20, 2019. The contents of this application are incorporated herein by reference in their entirety.

BACKGROUND OF THE INVENTION

Field of the Invention

The present invention relates to a table rotation device and a machine tool.

Discussion of the Background

Table rotation devices for rotating tables are known.

As a related art, WO2009/107493A1 discloses a rotary table device including a cooling structure. The rotary table device described in WO2009/107493A1 includes a rotary bearing. The rotary bearing includes an outer ring, an inner ring, and a rolling element. A heat sink is installed on the inner ring or the outer ring.

SUMMARY OF THE INVENTION

According to one aspect of the present invention, a table rotation device includes a bearing assembly, a table support member, a support block, and a cooling block. The bearing assembly includes a fixed ring provided around a rotation axis, a movable ring provided coaxially with the fixed ring to face the fixed ring, and rolling elements provided between the fixed ring and the movable ring so that the movable ring is rotatable about the rotation axis with respect to the fixed ring. The table support member is connected to the movable ring so as to fix a position of the table support member relative to a position of the movable ring. The support block is connected to the fixed ring so as to fix a position of the support block relative to a position of the fixed ring. The cooling block is connected to at least one of the fixed ring and the support block such that the cooling block is in contact with both the fixed ring and the support block, the cooling block providing a cooling passage.

According to another aspect of the present invention, a machine tool includes a table on which a workpiece is placed, a tool holding member configured to hold a tool to machine the workpiece, a second driver configured to move the tool holding member, and a table rotation device configured to rotate the table. The table rotation device includes a bearing assembly, a table support member, a support block, and a cooling block. The bearing assembly includes a fixed ring provided around a rotation axis, a movable ring provided coaxially with the fixed ring to face the fixed ring, and rolling elements provided between the fixed ring and the movable ring so that the movable ring is rotatable about the rotation axis with respect to the fixed ring. The table support member is connected to the movable ring so as to fix a position of the table support member relative to a position of the movable ring. The support block is connected to the fixed ring so as to fix a position of the support block relative to a position of the fixed ring. The cooling block is connected to at least one of the fixed ring and the support block such that the cooling block is in contact with both the fixed ring and the support block, the cooling block providing a cooling passage.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
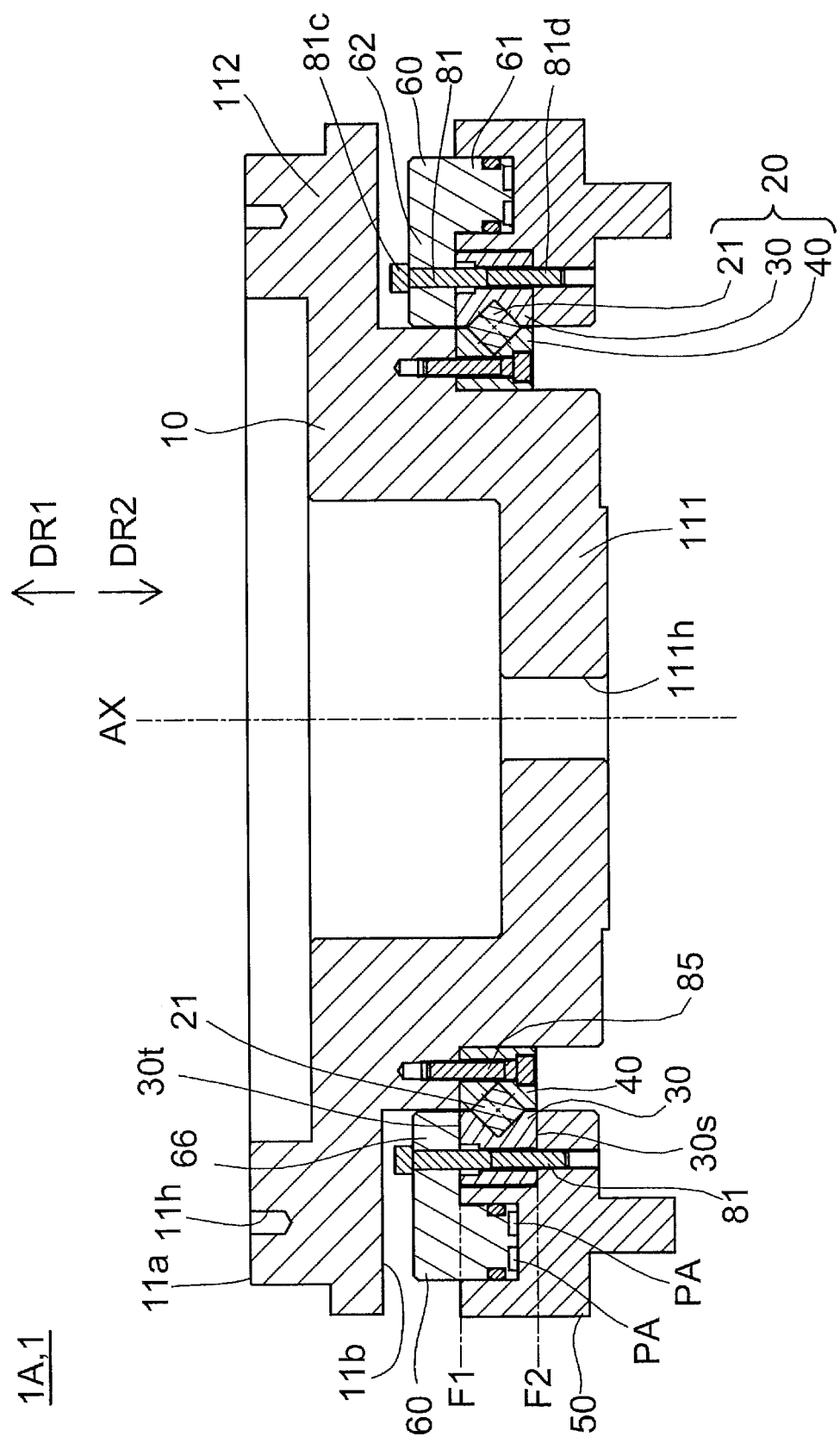
FIG. 1 is a schematic cross-sectional view of a table rotation device according to a first embodiment, schematically illustrating the table rotation device.

A table rotation device 1 and a machine tool 100 according to some embodiments will be described below by referring to the drawings. In the following description of the embodiments, parts, portions, members, and/or elements having the same function will be denoted with the same reference numerals, and description of parts, portions, members, and/or elements denoted with the same reference numerals will not be repeated.

Definitions of Directions and Terms

In the present specification, a direction parallel to a rotation axis AX of the table support member 10 and extending from a back surface 11b of the table support member 10 (more specifically, the lower surface of the table support member 10) toward a front surface 11a of the table support member 10 (more specifically, the upper surface of the table support member 10) is defined as "first direction DR1". The "first direction DR1" is, for example, an upward direction. In a case where the table support member 10 is tiltable (in other words, tiltable), the first direction DR1 changes when the table support member 10 tilts.

In the present specification, a direction opposite to the first direction DR1 is defined as "second direction DR2". The "second direction DR2" is, for example, a downward direction.

As used in the present specification, a fastening member refers to a mechanical member that connects a plurality of parts together. The fastening member, such as a first fastening member and a second fastening member, includes, for example, a head portion and a shank portion extending from the head portion. The fastening member may also be referred to as a fastener.

In the present specification, a machine tool 100 means any machine capable of machining a workpiece regarded as a to-be-machined object. A machine tool is, for example, a machine capable of cutting, machining, turning, or grinding metal. The machine tool in the present specification may be a combined multi-functional machine tool, which is capable of performing a plurality of different kinds of machining (an example is a machining center).

First Embodiment

Figure 2:
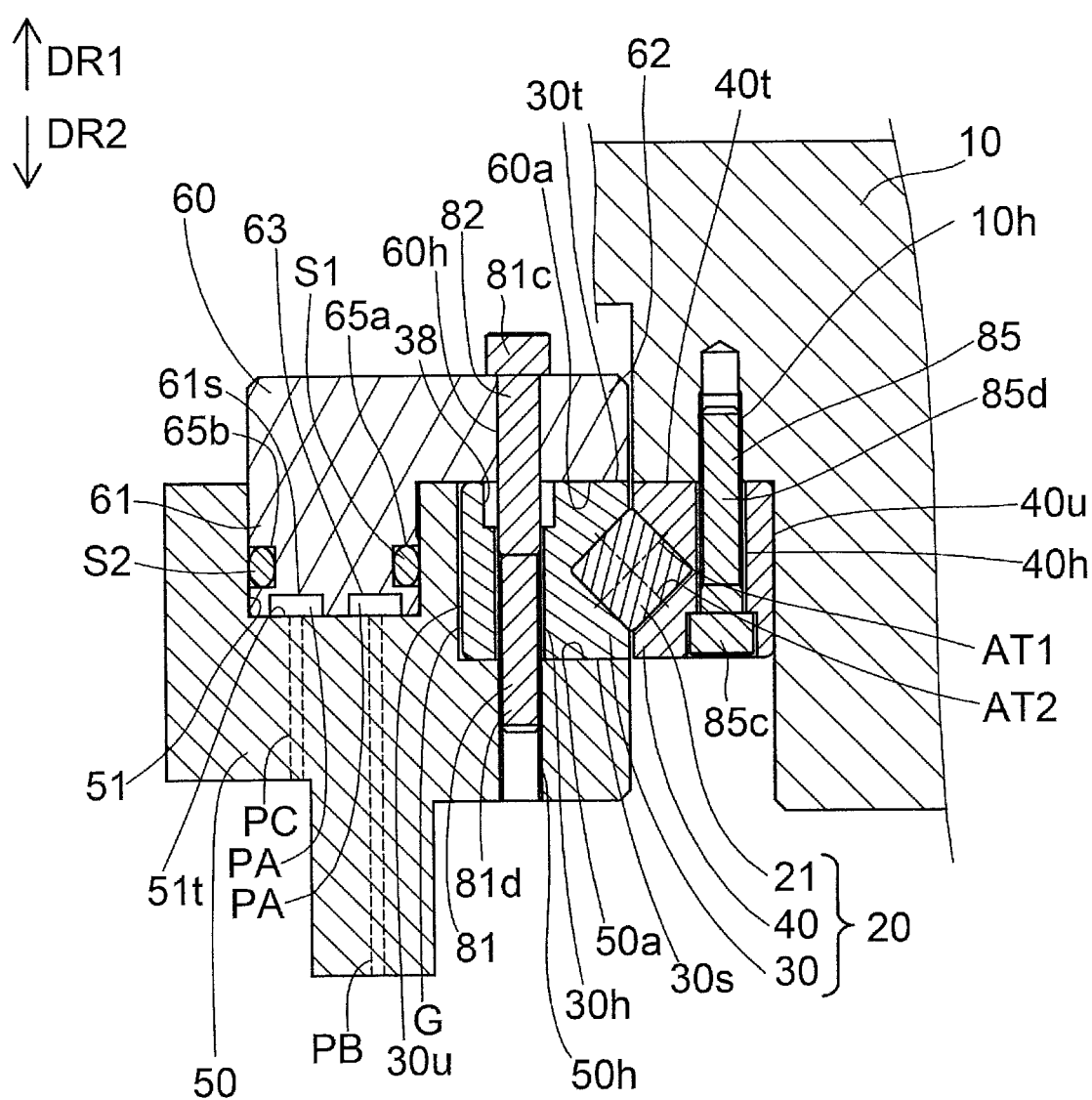
FIG. 2 is a schematic cross-sectional view of a part of the table rotation device according to the first embodiment, schematically illustrating the part of the table rotation device.
Figure 3:
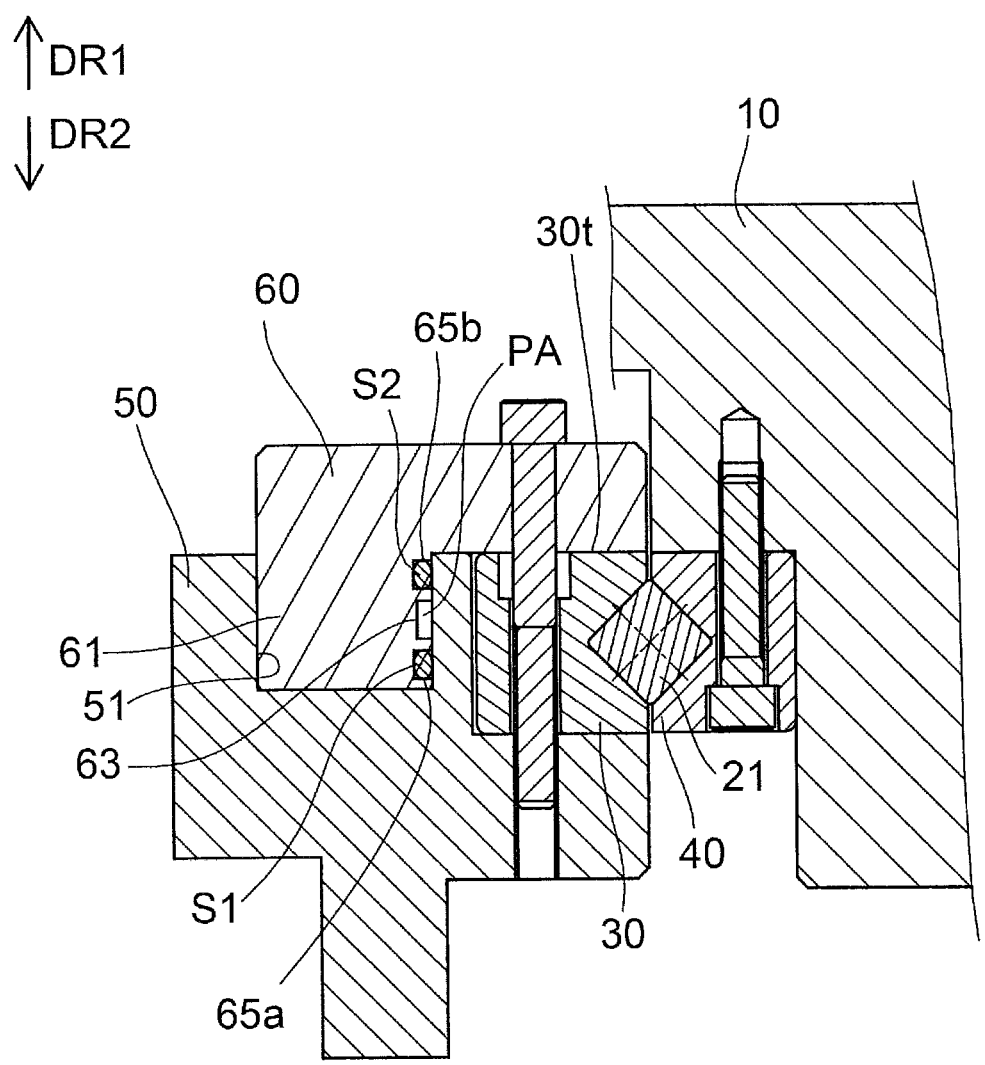
FIG. 3 is a schematic cross-sectional view of a part of a table rotation device according to a first modification of the first embodiment, schematically illustrating the part of the table rotation device.
Figure 4:
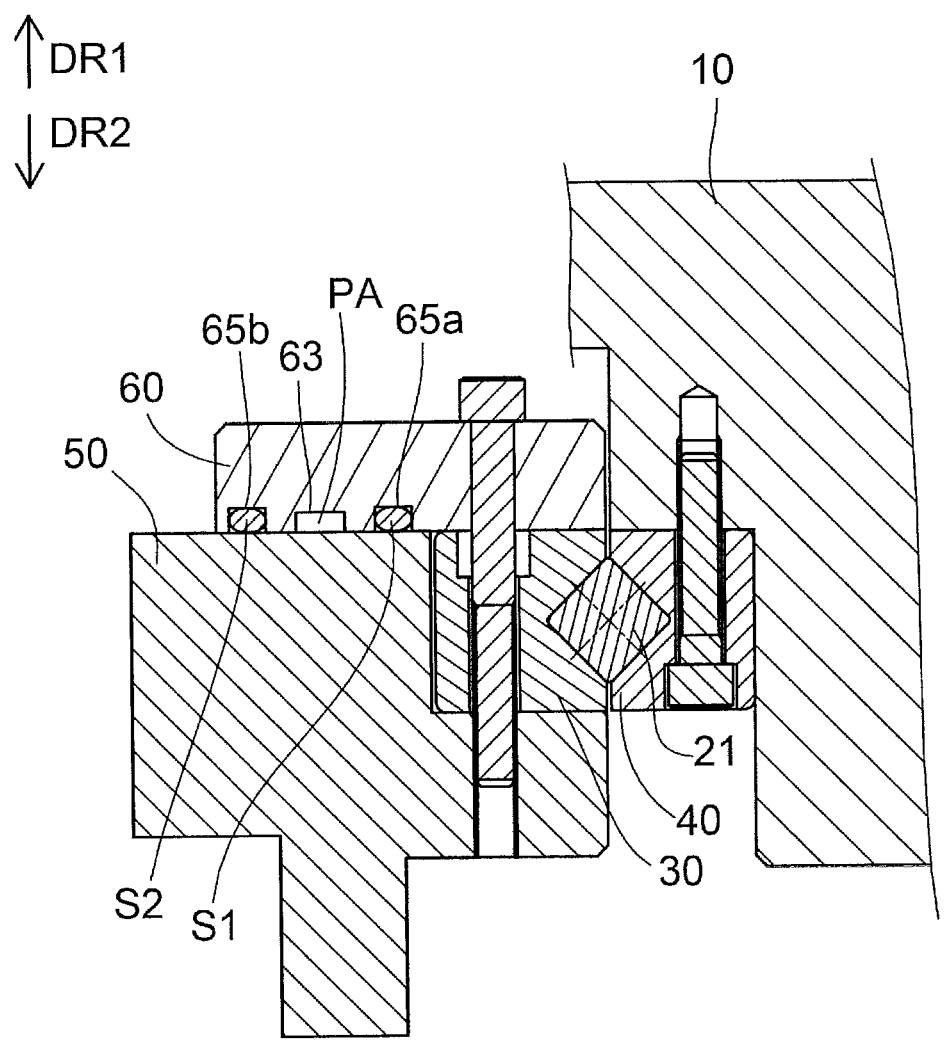
FIG. 4 is a schematic cross-sectional view of a part of a table rotation device according to a second modification of the first embodiment, schematically illustrating the part of the table rotation device.
Figure 5:
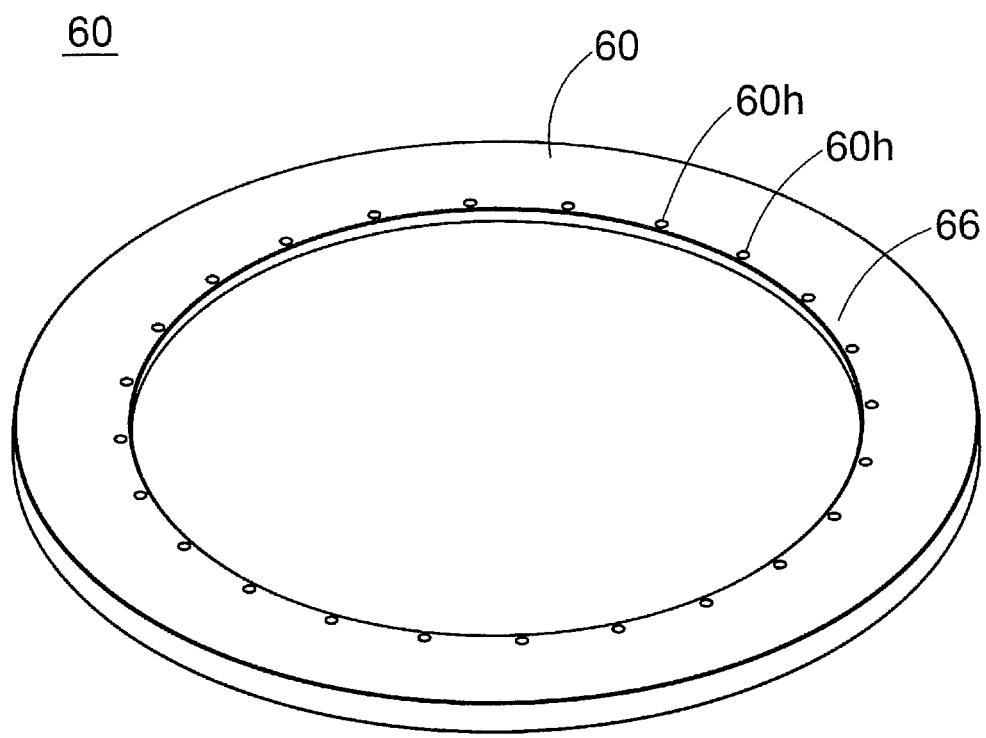
FIG. 5 is a schematic perspective view an example of a cooling block, schematically illustrating the cooling block.
Figure 6:
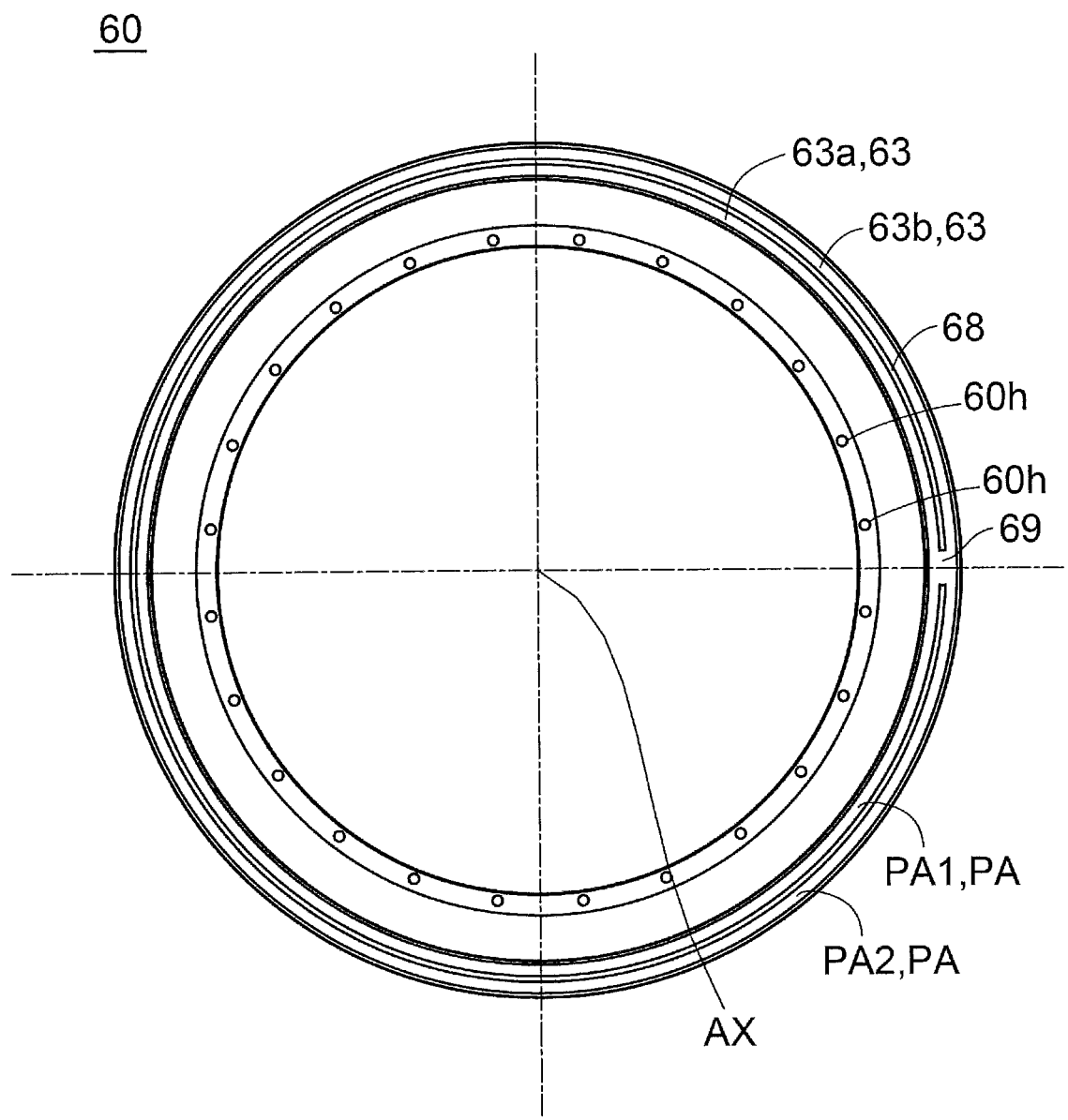
FIG. 6 is a schematic bottom view of the example of the cooling block, schematically illustrating the cooling block.
Figure 7:
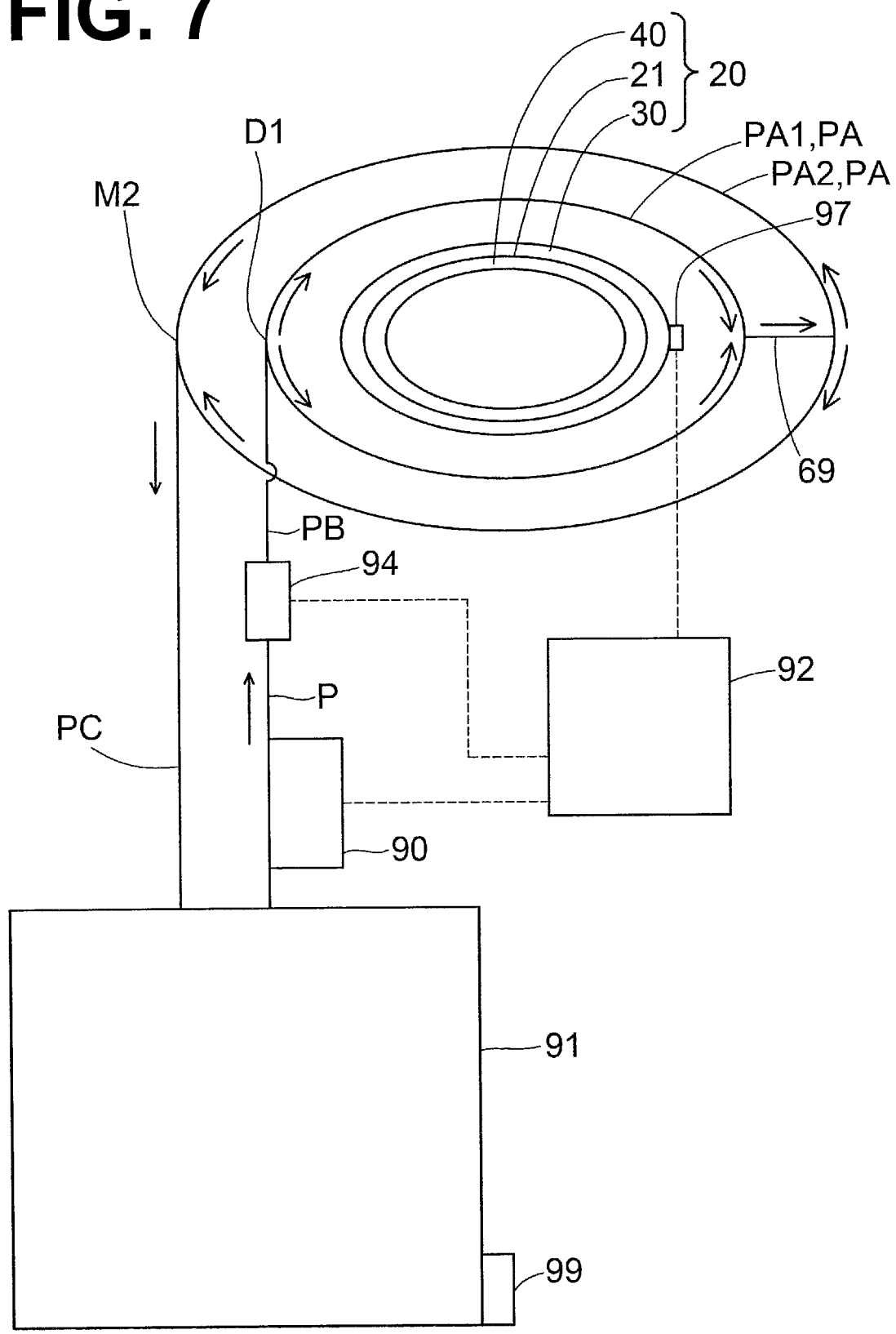
FIG. 7 schematically illustrates an example of a coolant supply system for supplying a coolant to a cooling passage.

A table rotation device 1A according to the first embodiment will be described by referring to FIGS. 1 to 7. FIG. 1 is a schematic cross-sectional view of the table rotation device 1A according to the first embodiment, schematically illustrating the table rotation device 1A, FIG. 2 is a schematic cross-sectional view of a part of the table rotation device 1A according to the first embodiment, schematically illustrating the part of the table rotation device 1A. FIG. 3 is a schematic cross-sectional view of a part of the table rotation device 1A according to the first modification of the first embodiment, schematically illustrating the part of the table rotation device 1A. FIG. 4 is a schematic cross-sectional view of a part of the table rotation device 1A according to a second modification of the first embodiment, schematically illustrating the part of the table rotation device 1A. FIG. 5 is a schematic perspective view of an example of a cooling block 60, schematically illustrating the cooling block 60. FIG. 6 is a schematic bottom view of the example of the cooling block 60, schematically illustrating the cooling block 60. FIG. 7 schematically illustrates an example of a coolant supply system that supplies a coolant to a cooling passage PA.

The table rotation device 1A according to the first embodiment includes a bearing assembly 20, the table support member 10, a support block 50, and the cooling block 60. The table rotation device 1A may include a first fastening member 81 and/or the second fastening member 85.

The bearing assembly 20 includes a fixed ring 30, a movable ring 40, and a rolling element 21. The movable ring 40 is rotatable about the rotation axis AX relative to the fixed ring 30. The rolling element 21 is provided between the fixed ring 30 and the movable ring 40. The bearing assembly 20 preferably includes a plurality of rolling elements 21 provided along the circumferential direction of the fixed ring 30 (or the movable ring 40). As the rolling elements 21 roll, the movable ring 40 rotates about the rotation axis AX relative to the fixed ring 30.

In the example illustrated in FIG. 1, the bearing assembly 20 is provided between the table support member 10 and the support block 50. More specifically, the bearing assembly 20 is provided between the outer circumferential surface of the table support member 10 and the inner circumferential surface of the support block 50.

Figure 14:
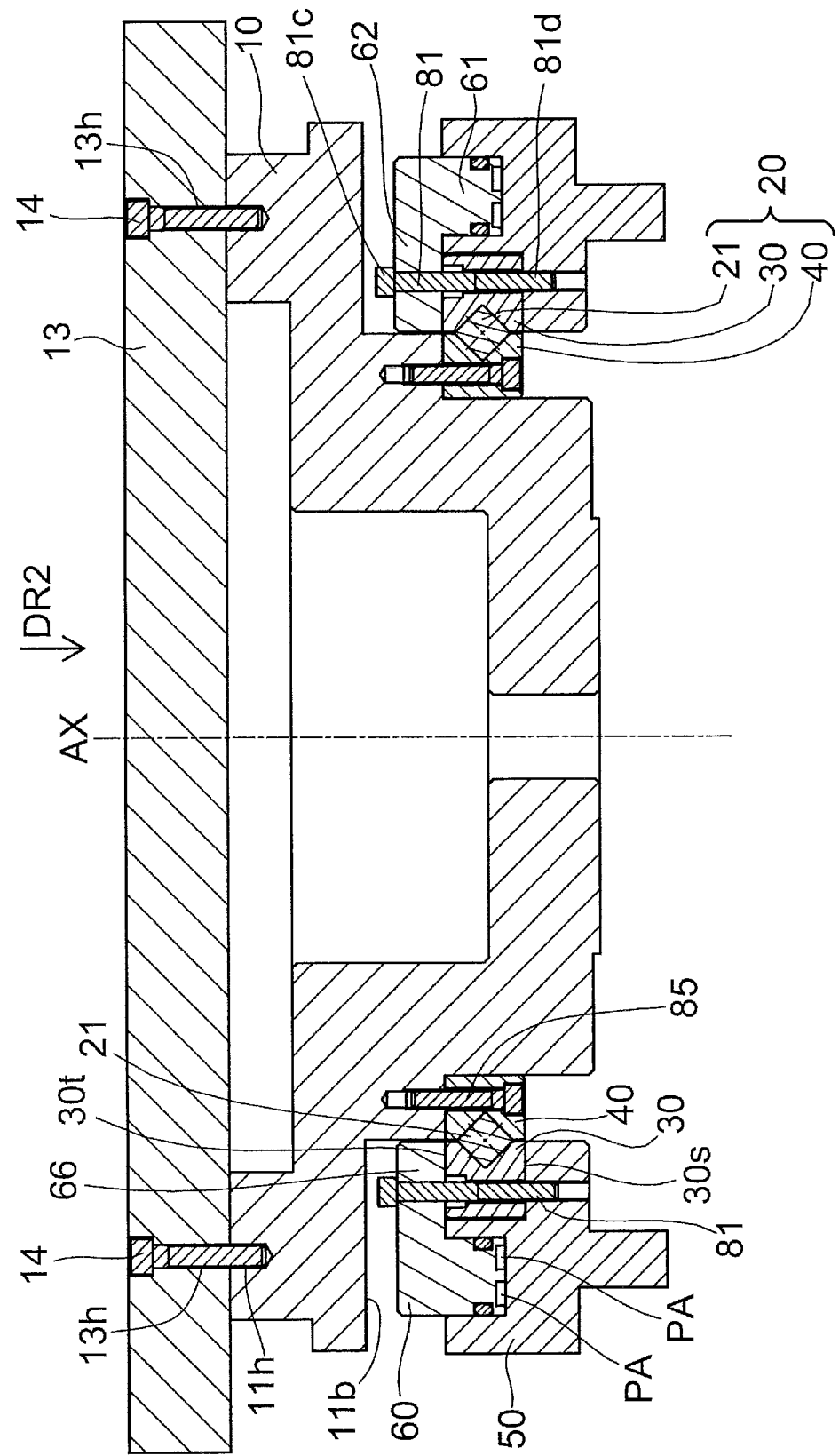
FIG. 14 is a schematic cross-sectional view of a table rotation device according to a fourth embodiment, schematically illustrating the table rotation device.
Figure 16:
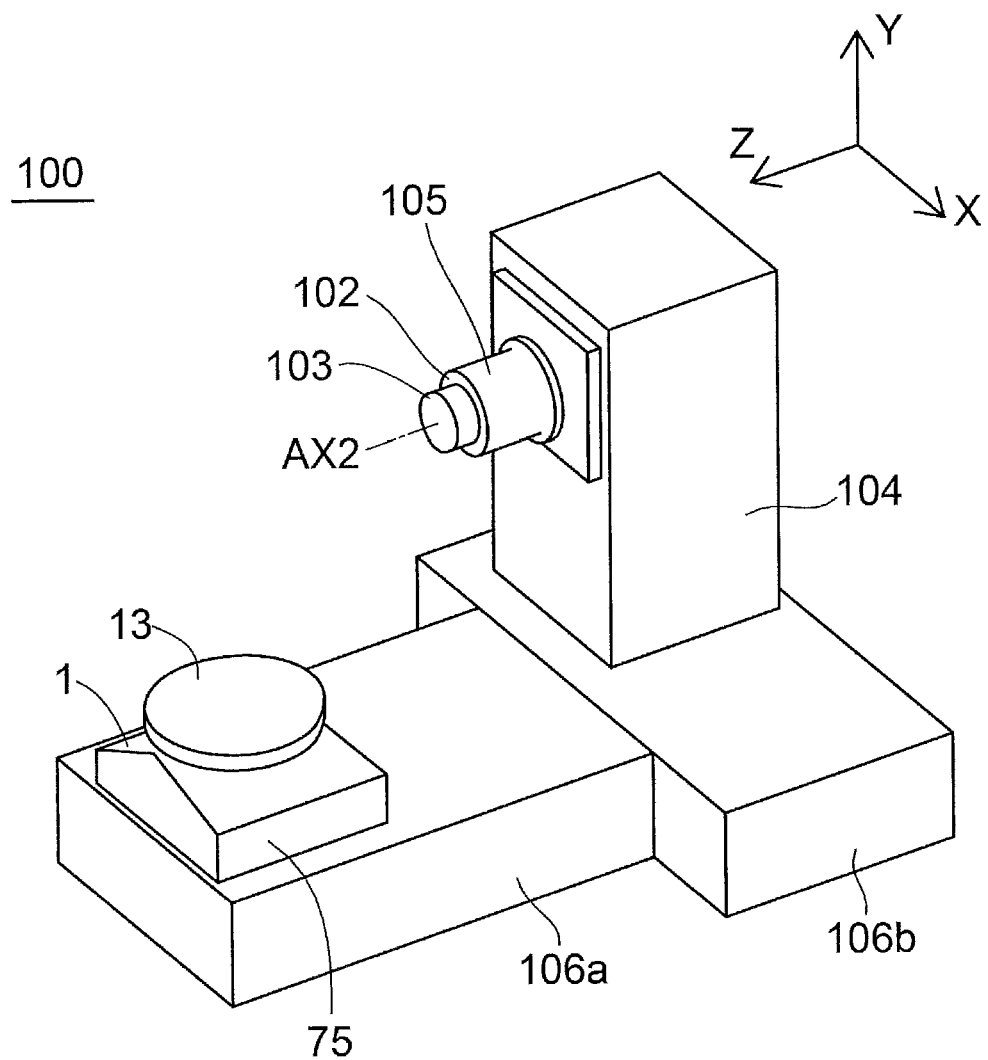
FIG. 16 is a schematic perspective view of a machine tool according to a sixth embodiment.

The table support member 10 is fixed to the movable ring 40 and supports a table 13 (see, for example, FIGS. 14 and 16). The table support member 10 is a member rotatable about the rotation axis AX together with the movable ring 40. A hole 11h, which is for fixing the table, may be formed on the upper surface 11a of the table support member 10. In order to fix the table 13, a clamp mechanism may be provided on the table support member 10, instead of the hole 11b. The center axis of the holes 11h is parallel to, for example, the rotation axis AX. In the example illustrated in FIG. 1, the back surface 11b of the table support member 10 (in other words, the surface of the table support member 10 on the second-direction DR2 side) is provided so as to face the upper surface of the cooling block 60, described later (in other words, the surface of the cooling block 60 on the first-direction DR1 side). The table support member 10 may be implemented by a single component or may be an assembly of a plurality of components. In the example illustrated in FIG. 1, a center portion 111 of the table support member 10 is depressed toward the second-direction DR2 side. A through hole 111h, which extends in a direction along the rotation axis AX, is formed in the center portion 111 (more specifically, in a bottom wall of the center portion 111). In the example illustrated in FIG. 1, the table support member 10 includes a flange portion 112, which extends outwardly from the center portion 111. The hole 11h is formed in the flange portion 112. It is to be noted that the shape of the table support member 10 will not be limited to the example illustrated in FIG. 1.

The support block 50 is fixed to the fixed ring 30 and supports the table support member 10 rotatably about the rotation axis AX. Thus, the support block 50 is capable of supporting the table support member 10 rotatably about the rotation axis AX via the bearing assembly 20, including the fixed ring 30. In the example illustrated in FIG. 1, the support block 50 is an annular member. In other words, the support block 50 is a ring-shaped block.

In the example illustrated in FIG. 1, the fixed ring 30 rotatably supports the movable ring 40 via the rolling elements 21. The fixed ring 30 is also fixed to the support block 50 so as not to be rotatable about the rotation axis AX. In this case, when the table support member 10 and the movable ring 40 rotate about the rotation axis AX, the support block 50 and the fixed ring 30 do not rotate about the rotation axis AX. In the example illustrated in FIG. 1, the fixed ring 30 is an outer ring (outer ring) provided outside the movable ring 40. The center axis of the fixed ring 30 coincides with the rotation axis AX of the movable ring 40.

When the table support member 10 rotates about the rotation axis AX, the movable ring 40 rotates about the rotation axis AX integrally with the table support member 10. In the example illustrated in FIG. 1, the movable ring 40 is an inner ring (inner ring) provided inside the fixed ring 30. The center axis of the movable ring 40 coincides with the rotation axis AX of the table support member 10.

The cooling block 60 defines at least a part of the cooling passage PA, through which a coolant (for example, cooling oil or cooling water) is passable. In the example illustrated in FIG. 1, the cooling passage PA is defined by the front surface of the cooling block 60 and the front surface of the support block 50. In this case, the coolant flowing through the cooling passage PA contacts both the front surface of the cooling block 60 and the front surface of the support block 50. Alternatively, the cooling passage PA may be formed inside the cooling block 60.

The cooling block 60 is fixed to the fixed ring 30 or the support block 50 so as to contact both the fixed ring 30 and the support block 50. In the example illustrated in FIG. 1, the cooling block 60 (more specifically, a second portion 62 of the cooling block 60) is fixed to the fixed ring 30 so as to contact both the fixed ring 30 and the support block 50.

In the example illustrated in FIG. 1, the cooling block 60 is implemented by a single component. Alternatively, the cooling block 60 may be an assembly of a plurality of components. For example, the cooling block 60 may be an assembly of a plurality of blocks.

The table rotation device 1A according to the first embodiment includes the cooling block 60, which contacts the fixed ring 30. The cooling block 60 contacts the coolant in the cooling passage PA. In this case, the heat in the fixed ring 30 is transferred to the coolant in the cooling passage PA via the cooling block 60.

In the table rotation device 1A according to the first embodiment, the fixed ring 30 is in contact with both the support block 50 and the cooling block 60. In this case, the heat of the fixed ring 30 is dissipated to both the support block 50 and the cooling block 60. In the example illustrated in FIG. 1, the support block 50 is in contact with the cooling block 60. In this case, the difference in temperature between the support block 50 and the cooling block 60 is reduced because of heat conduction between the support block 50 and the cooling block 60. As described above, in the example illustrated in FIG. 1, the heat of the fixed ring 30 is dissipated in a well-balanced manner by both the support block 50 and the cooling block 60.

Further, in the table rotation device 1A according to the first embodiment, a first heat transfer passage for transferring the heat of the fixed ring 30 to the coolant via the cooling block 60 is formed, and a second heat transfer passage for transferring the heat of the fixed ring 30 to the coolant via the support block 50 is formed. This ensures that the fixed ring 30 is efficiently cooled, and deviation of the heat in the fixed ring 30 is inhibited. As a result, thermal expansion of the fixed ring 30 is inhibited, and deviation of thermal expansion in the fixed ring 30 is inhibited.

Suppressing thermal expansion of the fixed ring 30 also inhibits positional deviation of the contact surface of the fixed ring 30 with respect to the support block 50. This configuration inhibits abnormal noise from the table rotation device 1A, which can occur if there were a positional deviation of the fixed ring 30. The above configuration also inhibits an increase in the vibration of the table 13, which can occur if there were a positional deviation of the fixed ring 30.

In addition, suppressing the deviation of the thermal expansion in the fixed ring 30 inhibits unstability of the behavior of the rolling element 21, which can occur if there were a distortion of the fixed ring 30. In this manner, generation of abnormal noise from the table rotation device 1A and vibration of the table 13 are further inhibited.

Optional Configurations

Next, by referring to FIGS. 1 and 2, description will be made with regard to optional configurations that can be employed in the table rotation device 1A according to the first embodiment.

First Fastening Member 81

The first fastening member 81 is a member that fixes the support block 50 and the fixed ring 30 to each other. In the example illustrated in FIG. 1, the first fastening member 81 is a bolt (first bolt) having a screw formed on the outer circumferential surface of the bolt. In the example illustrated in FIG. 1, the longitudinal center axis of the first fastening member 81 is parallel to the rotation axis AX. In the example illustrated in FIG. 1, the first fastening member 81 is provided such that the head 81c of the first fastening member 81 is positioned above a shank portion 81d of the first fastening member 81.

When the table rotation device 1A includes the first fastening member 81, which fixes the support block 50 and the fixed ring 30 to each other, the support block 50 and the fixed ring 30 can be efficiently fixed to each other. In addition, the support block 50 and the fixed ring 30 can be firmly fixed to each other, and positional deviation of the fixed ring 30 with respect to the support block 50 is inhibited.

In the example illustrated in FIG. 2, the first fastening member 81, which fixes the support block 50 and the fixed ring 30 to each other, and the fastening member 82, which fixes the cooling block 60 and the fixed ring 30 to each other, are the same member. In other words, the cooling block 60 is fixed to the fixed ring 30 by the first fastening member 81, which fixes the support block 50 and the fixed ring 30 to each other. This ensures that substantially the entire area of the upper end surface 30t of the fixed ring 30 is in contact with the cooling block 60. As a result, deviation of thermal expansion in the fixed ring 30 is inhibited. Furthermore, the work of integrating the support block 50, the fixed ring 30, and the cooling block 60 to each other is efficiently performed. In addition, relative positioning of the three components (namely, the support block 50, the fixed ring 30, and the cooling block 60) is efficiently performed.

More specifically, in the example illustrated in FIG. 2, a first hole 60h (more specifically, a first through hole) is formed in the cooling block 60. The first hole 60h receives a part of the first fastening member 81. Also, a second hole 30h (more specifically, a second through hole), which receives a part of the first fastening member 81, is formed in the fixed ring 30; and a third hole 50h (more specifically, a third through hole), which receives a part of the first fastening member 81, is formed in the support block 50.

The first hole 60h, the second hole 30h, and the third hole 50h are provided in a straight line. This configuration ensures that the cooling block 60, the fixed ring 30, and the support block 50 are positioned relative to each other. Also, the first fastening member 81 is inserted into the first hole 60h, the second hole 30h, and the third hole 50h. This configuration ensures that the cooling block 60, the fixed ring 30, and the support block 50 are integrated to each other.

In the example illustrated in FIG. 2, a depression 38 is formed in the fixed ring 30. The depression 38 is capable of receiving the head 81c of the first fastening member 81. It is to be noted, however, that the depression 38 is not used (in other words, the head 81c of the first fastening member 81 is not provided in the depression 38). Instead, the head 81c of the first fastening member 81 is provided such that the head 81c is in contact with the cooling block 60.

Alternatively, the head 81c of the first fastening member 81 may be provided in the depression 38. For example, for at least one of a plurality of first fastening members 81 to fix the fixed ring 30 and the support block 50 without fixing the cooling block 60, the head 81c of the first fastening member 81 may be provided in the depression 38, and the shank portion 81d of the first fastening member 81 may be provided in the second hole 30h and the third hole 50h.

Arrangement of Fixed Ring 30, Support Block 50, and Cooling Block 60

In the example illustrated in FIG. 2, the support block 50 has a first surface 50a, which is in contact with the fixed ring 30; and the cooling block 60 has a second surface 60a, which is in contact with the fixed ring 30. The fixed ring 30 is sandwiched between the first surface 50a of the support block 50 and the second surface 60a of the cooling block.

In this case, on both sides of the fixed ring 30 (more specifically, on the upper side of the fixed ring 30 and the lower side of the fixed ring 30), heat-conduction passages for transferring the heat in the fixed ring 30 to the outside of the fixed ring 30 are formed. This configuration, as a result, further inhibits deviation of the heat in the fixed ring 30 (in other words, deviation of thermal expansion in the fixed ring 30).

In addition, since the fixed ring 30 is sandwiched between the support block 50 and the cooling block 60, the thickness of the assembly including the fixed ring 30, the support block 50, and the cooling block 60 (in other words, the total thickness of the plurality of integrated components) increases. This increases the rigidity of the bearing assembly 20 on the fixed ring 30 side. As a result, vibration of the table 13 occurring while the table rotation device 1A is in use is inhibited.

In addition, since the fixed ring 30 is sandwiched between the support block 50 and the cooling block 60, deformation of the fixed ring 30 (for example, deformation of the fixed ring 30 because of thermal expansion) is inhibited.

In the example illustrated in FIG. 2, the fixed ring 30 is fixed to the support block 50 via the first fastening member 81 such that a lower end surface 30s of the fixed ring 30 is pressed by the first surface 50a of the support block 50. In this case, heat transfer from the lower end surface 30s to the first surface 50a is stably performed, and positional deviation between the lower end surface 30s and the first surface 50a is inhibited.

In the example illustrated in FIG. 2, the cooling block 60 is fixed to the fixed ring 30 via the fastening member 82 such that an upper end surface 30t of the fixed ring 30 is pressed by the second surface 60a of the cooling block 60. In this case, heat transfer from the upper end surface 30t to the second surface 60a is stably performed, and positional deviation between the upper end surface 30t and the second surface 60a is inhibited. It is to be noted that in the example illustrated in FIG. 2, the fastening member 82 and the first fastening member 81 are the same member. Alternatively, the fastening member 82 may be a member different from the first fastening member 81.

In the example illustrated in FIG. 2, the entirety of the upper end surface 30t of the fixed ring 30 ("the entirety" encompasses "substantially the entirety") is covered with the cooling block 60 (more specifically, the second portion 62, described later). In this case, heat transfer from the upper end surface 30t of the fixed ring 30 to the cooling block 60 is strengthened. Further, deformation of the upper end surface 30t of the fixed ring 30 is effectively inhibited by the cooling block 60.

In the example illustrated in FIG. 2, the entirety of the lower end surface 30s of the fixed ring 30 ("the entirety" encompasses "substantially the entirety") is covered with the support block 50. In this case, heat transfer from the lower end surface 30s of the fixed ring 30 to the support block 50 is strengthened. Further, deformation of the lower end surface 30s of the fixed ring 30 is effectively inhibited by the support block 50.

In the example illustrated in FIG. 2, the entirety of a circumferential surface 30u of the fixed ring 30 (more specifically, the outer circumferential surface of the fixed ring 30) ("the entirety" encompasses "substantially the entirety") is covered with the support block 50.

As illustrated in FIG. 2, a gap G may be formed between the circumferential surface 30u (in other words, annular side surface) of the fixed ring 30 and the support block 50. In this case, when the bearing assembly 20 thermally expands, the gap G functions as a buffer that receives the expanded portion. This configuration prevents a seizure from occurring in the bearing assembly 20, which can occur if there were thermal expansion of the bearing assembly 20.

When the gap G is formed between the circumferential surface 30u of the fixed ring 30 and the support block 50, heat transfer from the circumferential surface 30u to the support block 50 cannot be expected. However, in the example illustrated in FIG. 2, a first heat transfer passage for transferring the heat of the fixed ring 30 from the upper end surface 30t of the fixed ring 30 to the cooling block 60 is secured, and a second heat transfer passage for transferring the heat of the fixed ring 30 from the lower end surface 30s of the fixed ring 30 to the support block 50 is secured. This ensures that the fixed ring 30 is efficiently cooled, and deviation of the heat in the fixed ring 30 is inhibited. As a result, thermal expansion of the fixed ring 30 is inhibited, and deviation of thermal expansion in the fixed ring 30 is inhibited.

It is to be noted that when the thermal expansion of the fixed ring 30 is sufficiently inhibited, the gap G may not necessarily be formed between the circumferential surface 30u of the fixed ring 30 and the support block 50. In other words, the circumferential surface 30u of the fixed ring 30 and the support block 50 may be in contact with each other.

Arrangement of Cooling Passage PA

In the example illustrated in FIG. 1, the cooling passage PA is provided between: a plane (an example of "a second plane") F2, which passes through the lower end (in other words, the end on the second-direction DR2 side) of the fixed ring 30 and which is perpendicular to the rotation axis AX; and a plane (an example of "a first plane") F1, which passes through the upper end (in other words, the end on the first-direction DR1 side) of the fixed ring 30 and which is perpendicular to the rotation axis AX. More specifically, the cooling passage PA is provided above the lower end surface 30s of the fixed ring 30 (in other words, the surface on the second-direction DR2 side of the fixed ring 30). Also, the cooling passage PA is provided below the upper end surface 30t of the fixed ring 30 (in other words, the surface on the first-direction DR1 side of the fixed ring 30).

This configuration reduces the difference between: the distance between the upper end surface 30t of the fixed ring 30 and the cooling passage PA; and the distance between the lower end surface 30s of the fixed ring 30 and the cooling passage PA. This, in turn, reduces the difference between: the amount of heat dissipation from the upper end surface 30t of the fixed ring 30 to the coolant in the cooling passage PA; and the amount of heat dissipation from the lower end surface 30s of the fixed ring 30 to the coolant in the cooling passage PA. As a result, deviation of the heat in the fixed ring 30 (in other words, deviation of thermal expansion in the fixed ring 30) is further inhibited. It is to be noted that the cooling passage PA is preferably an annular passage provided between the plane F1 and the plane F2. In this case, the cooling passage PA generates a flow of the coolant in a circumferential direction (in other words, a direction around the rotation axis AX) in an area between the plane F1 and the plane F2.

In the example illustrated in FIG. 2, the cooling passage PA is provided between a front surface 61s of the cooling block 60 and a front surface 51t of the support block 50. In this case, the front surface 61s of the cooling block 60 is directly cooled by the coolant, and the front surface 51t of the support block 50 is directly cooled by the coolant. This ensures that the first heat-conduction passage, through which the heat of the fixed ring 30 is transferred to the coolant via the cooling block 60, and the second heat-conduction passage, through which the heat of the fixed ring 30 is transferred to the coolant via the support block 50, function in a well-balanced manner. In addition, the configuration in which the cooling passage PA is provided between the front surface 61s of the cooling block 60 and the front surface 51t of the support block 50 makes it easier to form the cooling passage PA than the configuration in which the cooling passage PA is formed inside the cooling block 60. It is to be noted, however, that the first embodiment does not exclude the configuration in which the cooling passage PA is formed inside the cooling block 60.

In the example illustrated in FIG. 2, the support block 50 has a depression 51. More specifically, an annular depression 51 is formed in the upper surface of the support block 50. The cooling block 60 includes: a first portion 61, which is inserted into the depression 51 of the support block 50; and a second portion 62, which is provided outside the depression 51 of the support block 50. Also in the example illustrated in FIG. 2, the first portion 61 defines at least a part of the cooling passage PA.

The configuration in which at least a part of the cooling passage PA is defined by the first portion 61, which is inserted into the depression 51 of the support block 50 ensures that the cooling passage PA can be provided in the region within the depression 51 of the support block 50. This enhances the ability of the second heat-conduction passage to transfer the heat of the fixed ring 30 to the coolant via the support block 50.

First O-Ring S1 and Second O-Ring S2

In the example illustrated in FIG. 2, the table rotation device 1A includes: a first O-ring S1, which attenuates vibration of the cooling block 60 (or vibration of the cooling block 60 and the fixed ring 30); and a second O-ring S2, which attenuates vibration of the cooling block 60 (or vibration of the cooling block 60 and the fixed ring 30). The first O-ring S1 and the second O-ring S2 are provided between the support block 50 and the cooling block 60.

Each of the first O-ring S1 and the second O-ring S2 is made of an elastically deformable material. Preferably, the center of the first O-ring S1 is located on the rotation axis AX, and the center of the second O-ring S2 is located on the rotation axis AX. In this case, vibration of the cooling block 60 (or vibration of the cooling block 60 and the fixed ring 30) is attenuated in a well-balanced manner.

It is to be noted that the number of the O-rings (S1, S2), which attenuate vibration of the cooling block 60, is preferably two or more. In the configuration in which the number of the O-rings is two or more, vibration of the cooling block 60 is effectively attenuated.

Alternatively or additionally, the first O-ring S1 and the second O-ring S2 may function as members for preventing leakage of the coolant.

In the example illustrated in FIG. 2, the front surface 51t, which defines the depression 51 of the support block 50 (more specifically, the bottom surface of the depression 51) defines a part of the cooling passage PA. In the example illustrated in FIG. 2, the O-rings (S1, S2) are provided such that the O-rings are in contact with the front surface 51t, which defines the depression 51. Thus, the coolant is prevented from leaking from the depression 51 of the support block 50.

In the example illustrated in FIG. 2, the first O-ring S1 is provided between the inner circumferential surface of the first portion 61 and the support block 50. Also, the second O-ring S2 is provided between the outer circumferential surface of the first portion 61 and the support block 50. The inner diameter of the second O-ring S2 is greater than the outer diameter of the first O-ring S1.

In the example illustrated in FIG. 2, the cooling passage PA is provided on the lower surface of the first portion 61. Alternatively, as illustrated in FIG. 3, the cooling passage PA may be provided on the inner circumferential surface of the first portion 61. In this case, the second O-ring S2, as well as the first O-ring S1, is provided to contact the inner circumferential surface of the first portion 61. In the example illustrated in FIG. 3, the first O-ring S1 is provided below the cooling passage PA, and the second O-ring S2 is provided above the cooling passage PA. Also, the inner diameter of the first O-ring S1 is equal to the inner diameter of the second O-ring S2.

Material and Shape of Cooling Block 60

The cooling block 60 is preferably formed of a material having a high degree of thermal conductivity (for example, a metal such as iron). This enhances the ability of the first heat-conduction passage to transfer the heat of the fixed ring 30 to the coolant via the cooling block 60.

The material of the cooling block 60 may be the same as or different from the material of the support block 50. The configuration in which the material of the cooling block 60 and the material of the support block 50 are the same ensures that the first heat-conduction passage, through which the heat of the fixed ring 30 is transmitted to the coolant via the cooling block 60, and the second heat-conduction passage, through which the heat of the fixed ring 30 is transmitted to the coolant via the support block 50, function in a well-balanced manner.

As the material constituting the cooling block 60, it is possible to adopt a material having a high vibration-proof property, such as cast iron and carbon fiber reinforced plastic (CFRP). In this case, the material constituting the cooling block 60 may be a material having a higher vibration-proof property than the material constituting the support block 50, or may be a material having a vibration-proof property equivalent to the material constituting the support block 50.

In the example illustrated in FIG. 1, the cooling block 60 has the first portion 61 and the second portion 62, and the first portion 61 protrudes from the second portion 62 in a direction along the rotation axis AX (more specifically, in the second direction DR2). The second portion 62 is implemented by, for example, a ring-shaped plate member. Also, the first portion 61 is implemented by, for example, an annular protruding member that protrudes from the second portion 62 in the second direction DR2.

In the example illustrated in FIG. 2 or 3, the second portion 62 is provided in contact with the upper end surface 30t of the fixed ring 30. This ensures that the heat in the fixed ring 30 is transferred to the first portion 61 via the second portion 62.

In the example illustrated in FIG. 2 or 3, the cooling block 60 includes: an annular depression 63, which defines at least a part of the cooling passage PA; a first annular groove 65a, which receives the first O-ring S1; and a second annular groove 65b, which receives the second O-ring S2.

In the example illustrated in FIG. 2 or 3, the shape of a cross-section of the cooling block 60 cut along a plane perpendicular to the circumferential direction of the cooling block 60 (in other words, the shape of a cross-section of the cooling block 60 cut along a plane including the rotation axis AX) is the shape of an L. However, in the first embodiment, the shape of a cross-section of the cooling block 60 cut along a plane perpendicular to the circumferential direction of the cooling block 60 will not be limited to the shape of an L. The shape of a cross-section of the cooling block 60 cut along a plane perpendicular to the circumferential direction of the cooling block 60 may be a rectangular shape as illustrated in FIG. 4.

An example of the cooling block 60 that can be employed in the first embodiment (or another embodiment described later) will be described by referring to FIGS. 5 and 6.

In the example illustrated in FIG. 5, the cooling block 60 has a ring shape. A plurality of first holes 60h (more specifically, a plurality of first through holes) are formed in the cooling block 60. Into the plurality of first holes 60h, fastening members such as bolts are inserted. When an inner region 66 of the cooling block 60 is provided in contact with the fixed ring 30 (see FIG. 1), the plurality of first holes 60h are preferably formed in the inner region 66 of the cooling block 60. When, in contrast, an outer region 67 of the cooling block 60 is provided in contact with the fixed ring 30 (see FIG. 8), the plurality of first holes 60h are preferably formed in the outer region 67 of the cooling block 60.

In the example illustrated in FIG. 6, the annular depression 63, which defines at least a part of the cooling passage PA, includes a first annular depression 63a and a second annular depression 63b, which is provided outside the first annular depression 63a. In the example illustrated in FIG. 6, the cooling block 60 has a partition wall 68, and the partition wall 68 is provided between the first annular depression 63a and the second annular depression 63b. In the example illustrated in FIG. 6, a passage 69 is formed in the cooling block 60 to communicate the first annular depression 63a with the second annular depression 63b. The passage 69 is, for example, a notch formed in the partition wall 68.

Movable Ring 40

In the example illustrated in FIG. 2, the movable ring 40 is fixed to the table support member 10.

In the example illustrated in FIG. 2, the table rotation device 1A includes a second fastening member 85, which secures the movable ring 40 to the table support member 10. In the example illustrated in FIG. 2, the second fastening member 85 is a bolt (second bolt) having a screw formed on the outer circumferential surface of the second fastening member 85.

In the example illustrated in FIG. 2, a fourth hole 40h (more specifically, a through hole) is formed in the movable ring 40. The fourth hole 40h receives at least a part of the second fastening member 85. Also, a fifth hole 10h is formed in the table support member 10. The fifth hole 10h receives a part of the second fastening member 85 (more specifically, a leading end portion of the second fastening member 85).

With the second fastening member 85 inserted into the fourth hole 40h and the fifth hole 10h, the movable ring 40 is fixed to the table support member 10. The longitudinal center axis of the second fastening member 85 is parallel to, for example, the rotation axis AX of the table support member 10. Also, in the example illustrated in FIG. 2, the second fastening member 85 is provided such that a head 85c of the second fastening member 85 is positioned below a shank portion 85d of the second fastening member 85.

An inner circumferential surface 40u of the movable ring 40 and the table support member 10 are preferably in contact with each other. In other words, there is preferably no gap between the inner circumferential surface 40u of the movable ring 40 and the table support member 10. In this case, positional deviation between the movable ring 40 and the table support member 10 is inhibited. This enables the table rotation device 1A to rotate the table support member 10 with high accuracy.

In the example illustrated in FIG. 2, the upper end surface 40t of the movable ring 40 is in contact with the lower surface of the table support member 10, and the inner circumferential surface 40u of the movable ring 40 is in contact with the outer circumferential surface of the table support member 10. In this case, the heat in the movable ring 40 is efficiently dissipated to the table support member 10. It is possible that a cooling passage through which a coolant is passable is provided inside the table support member 10.

Rolling Element 21

As the rolling element 21 provided between the fixed ring 30 and the movable ring 40, it is possible to adopt any rolling element known in the field of bearings. The rolling element 21 may be a ball. In this case, the bearing assembly 20 serves as a ball bearing. The rolling element 21 may be a roller. In this case, the bearing assembly 20 serves as a roller bearing. The bearing assembly 20 may be a cross roller bearing. In the case of a cross roller bearing, an extending direction of a rotation axis AT1 of a first roller serving as a rolling element is substantially perpendicular to an extending direction of a rotation axis AT2 of a second roller adjacent to the first roller.

When the rolling element 21 is a roller, the rigidity of the bearing assembly 20 as a whole is increased as compared with the case where the rolling element 21 is a ball. When, in contrast, the rolling element 21 is a roller, the frictional heat generated in the bearing assembly 20 during operation of the table rotation device 1A becomes larger than when the rolling element 21 is a ball. In the table rotation device 1A according to the first embodiment, the heat in the fixed ring 30 is transferred to the coolant flowing in contact with the cooling block 60. This enables the table rotation device 1A to deal with generation of a high degree of frictional heat. For example, when there is a high degree of frictional heat generated in the bearing assembly 20, it is possible to increase the flow rate of the coolant.

Preferably, a lubricating means is applied to the bearing assembly 20. There is no particular limitation to the type of lubrication means applicable to the bearing assembly 20. The lubricating means may be grease, oil, or a mixture of oil and air.

Coolant Supplier 90

As illustrated in FIG. 7, the table rotation device 1A according to the first embodiment may include: a coolant supplier 90 (more specifically, a pump), which supplies the coolant to the cooling passage PA, which is provided in the cooling block 60; and a controller 92, which controls the coolant supplier 90.

In the example illustrated in FIG. 7, the table rotation device 1A has a circulating passage P, through which the coolant circulates, and the coolant supplier 90 is provided in the circulating passage P. The circulating passage P includes: the cooling passage PA, which is provided in the cooling block 60; a supply passage PB, through which the coolant is supplied to the cooling passage PA; and a return passage PC (return passage), through which the coolant is recovered from the cooling passage PA. In the example illustrated in FIG. 7, the downstream end of the return passage PC and the upstream end of the supply passage PB are connected to a coolant container 91.

It is possible that a part of the supply passage PB and/or a part of the return passage PC are formed inside the support block 50 (see, for example, FIG. 2). Alternatively, a part of the supply passage PB and/or a part of the return passage PC may be formed inside the cooling block 60.

In the example illustrated in FIG. 7, the cooling passage PA is provided to surround the bearing assembly 20 in a plan view (in other words, as viewed in a direction along the second direction DR2). In the example illustrated in FIG. 7, the cooling passage PA includes a first annular passage PA1 and a second annular passage PA2 provided outside the first annular passage PAL In the example illustrated in FIG. 7, the supply passage PB is connected to the first annular passage PA1, and the return passage PC is connected to the second annular passage PA2. In this case, the coolant passes through the supply passage PB, the first annular passage PA1, the second annular passage PA2, and the return passage PC in this order.

In the example illustrated in FIG. 7, the downstream end of the supply passage PB is connected to a branch D1 of the cooling passage PA. Also, the upstream end of the return passage PC is connected to a confluence M2 of the cooling passage PA. Also, the first annular passage PA1 and the second annular passage PA2 communicate with each other via the passage 69.

In the example illustrated in FIG. 7, the cooling passage PA, which is provided in the cooling block, includes two annular passages (PA1, PA2). Alternatively, the cooling passage PA, which is provided in the cooling block, may include a single annular passage or may include three or more annular passages.

The controller 92 is connected in a signal-communicable manner with the coolant supplier 90. By the controller 92 transmitting a drive signal to the coolant supplier 90, the coolant supplier 90 is driven into operation. Also, by the controller 92 transmitting a stop signal to the coolant supplier 90, the coolant supplier 90 is stopped from driving.

The table rotation device 1A according to the first embodiment may include a flow rate adjustor 94 (for example, a flow rate adjusting valve), in addition to the coolant supplier 90 and the controller 92. The flow rate adjustor 94 adjusts the flow rate of the coolant supplied to the cooling passage PA.

In the example illustrated in FIG. 7, the flow rate adjustor 94 is a device different from the coolant supplier 90. Alternatively, the flow rate adjustor 94 may be included in the coolant supplier 90. For example, when the coolant supplier 90 is a pump with a flow rate adjustment function, the coolant supplier 90 functions as the flow rate adjustor 94.

The controller 92 is connected in a signal-communicable manner with flow rate adjustor 94. It is possible that by the controller 92 transmitting a first signal to the flow rate adjustor 94, the flow rate of the coolant supplied to the cooling passage PA is increased. For example, by the controller 92 transmitting a first signal to the flow rate adjustor 94, the opening degree of the flow rate adjusting valve of the flow rate adjustor 94 may be increased, or the opening area of the orifice of the flow rate adjustor 94 may be increased. Also, it is possible that by the controller 92 transmitting a second signal to the flow rate adjustor 94, the flow rate of the coolant supplied to the cooling passage PA is decreased. For example, by the controller 92 transmitting a second signal to the flow rate adjustor 94, the opening degree of the flow rate adjusting valve of the flow rate adjustor 94 may be decreased, or the opening area of the orifice of the flow rate adjustor 94 may be decreased.

When the table rotation device 1A according to the first embodiment includes the flow rate adjustor 94, the cooling capability can be adjusted in accordance with the specification of the table rotation device 1A or a usage condition under which the table rotation device 1A is used. For example, under such a usage condition that the table 13 is rotated at high speed (or such a usage condition that the position of the table 13 is changed highly frequently), the flow rate of the coolant supplied to the cooling passage PA may be set at a relatively large flow rate. For another example, under such a usage condition that the table 13 is rotated at low speed (or such a usage condition that the position of the table 13 is changed less frequently), the flow rate of the coolant supplied to the cooling passage PA may be set at a relatively low flow rate. Under the usage condition in which the table 13 is rotated at low speed, it is possible to stop the supply of the coolant to the cooling passage PA.

The table rotation device 1A according to the first embodiment may include a temperature sensor 97, which detects the temperature of the bearing assembly 20 (for example, the temperature sensor 97 to detect the temperature of the fixed ring 30). The temperature sensor 97 may be provided on the bearing assembly 20 (for example, the fixed ring 30).

In the example illustrated in FIG. 7, the temperature sensor 97 is connected in a signal-communicable manner with the controller 92. The temperature sensor 97 transmits a signal including temperature data to the controller 92. The controller 92 controls the flow rate adjustor 94 based on the signal (more specifically, the signal including temperature data) received from the temperature sensor 97.

For example, when the temperature indicated by the signal received from the temperature sensor 97 is higher than a preset first temperature, the controller 92 may send the above-described first signal to the flow rate adjustor 94. Upon receipt of the first signal, the flow rate adjustor 94 increases the flow rate of the coolant supplied to the cooling passage PA. Also, when the temperature indicated by the signal received from the temperature sensor 97 is lower than a preset second temperature, the controller 92 may transmit the above-described second signal to the flow rate adjustor 94. Upon receipt of the second signal, the flow rate adjustor 94 decreases the flow rate of the coolant supplied to the cooling passage PA. The second temperature may be the same temperature as the first temperature, or may be a temperature different from the first temperature.

When the table rotation device 1A according to the first embodiment includes the temperature sensor 97 and the controller 92 (a controller that controls the flow rate adjustor 94 based on a signal received from the temperature sensor 97), in addition to the flow rate adjustor 94, the temperature of the bearing assembly 20 (for example, the fixed ring 30) can be maintained within a predetermined temperature range. For example, the temperature of the bearing assembly 20 (for example, the fixed ring 30) may be maintained within a predetermined temperature range by increasing the flow rate of the coolant supplied to the cooling passage PA in response to an increase in the temperature of the bearing assembly 20 and by decreasing the flow rate of the coolant supplied to the cooling passage PA in response to a decrease in the temperature of the bearing assembly 20. By maintaining the temperature of the bearing assembly 20 within a predetermined range, the behavior of the rolling element 21 is stabilized, the occurrence of abnormal noise and vibration is inhibited, and the table 13 is rotated with high accuracy.

In the table rotation device 1A according to the first embodiment, a coolant at room temperature may be supplied as the coolant. Alternatively, a coolant whose temperature is kept constant may be supplied as the coolant. In this case, the table rotation device 1A may include a cooler 99, which maintains the temperature of the coolant supplied to the cooling passage PA constant. The cooler 99 is provided such that the cooler 99 is in contact with, for example, the coolant container 91 or a pipe defining the circulating passage P.

Second Embodiment

Figure 8:
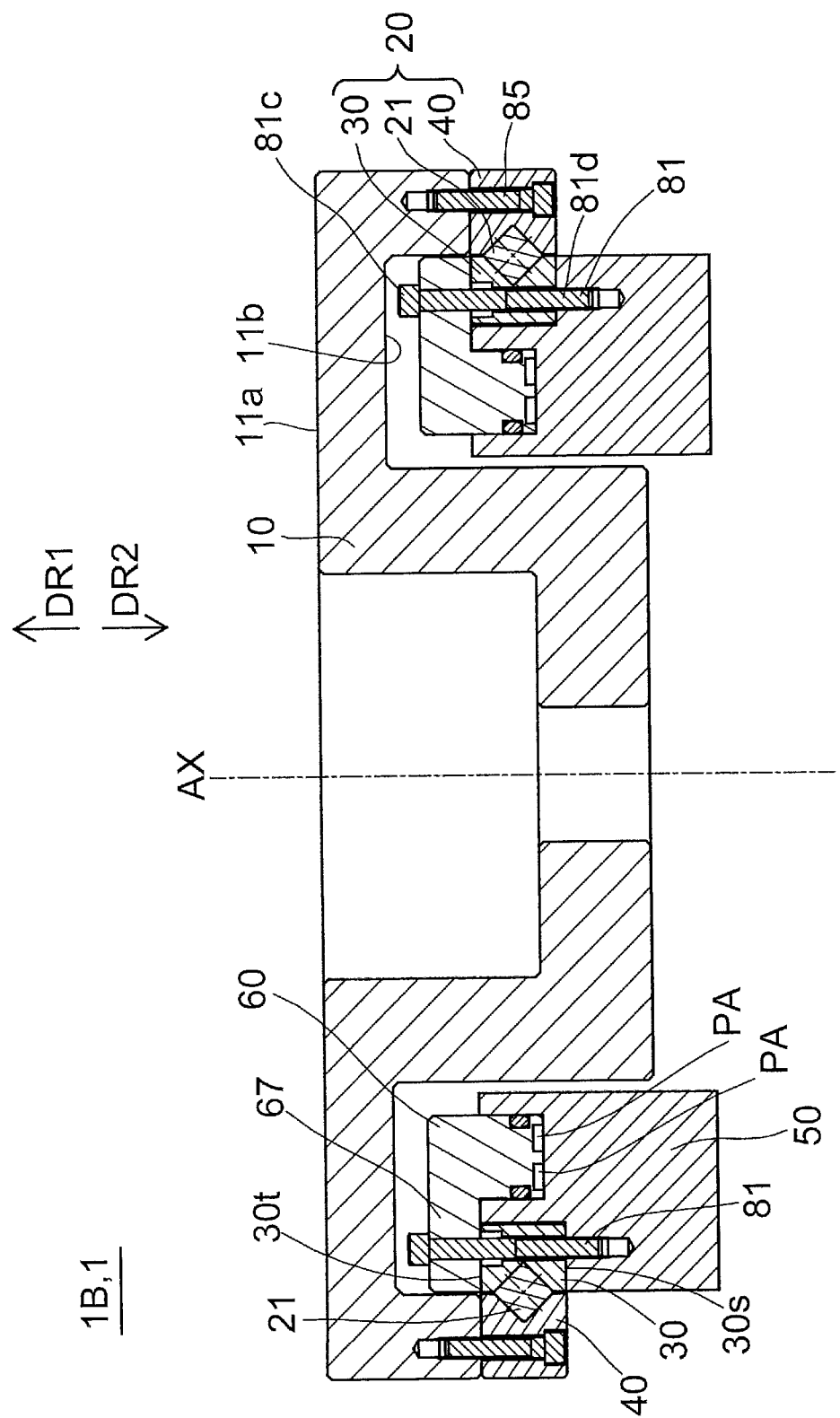
FIG. 8 is a schematic cross-sectional view of a table rotation device according to a second embodiment, schematically illustrating the table rotation device.
Figure 9:
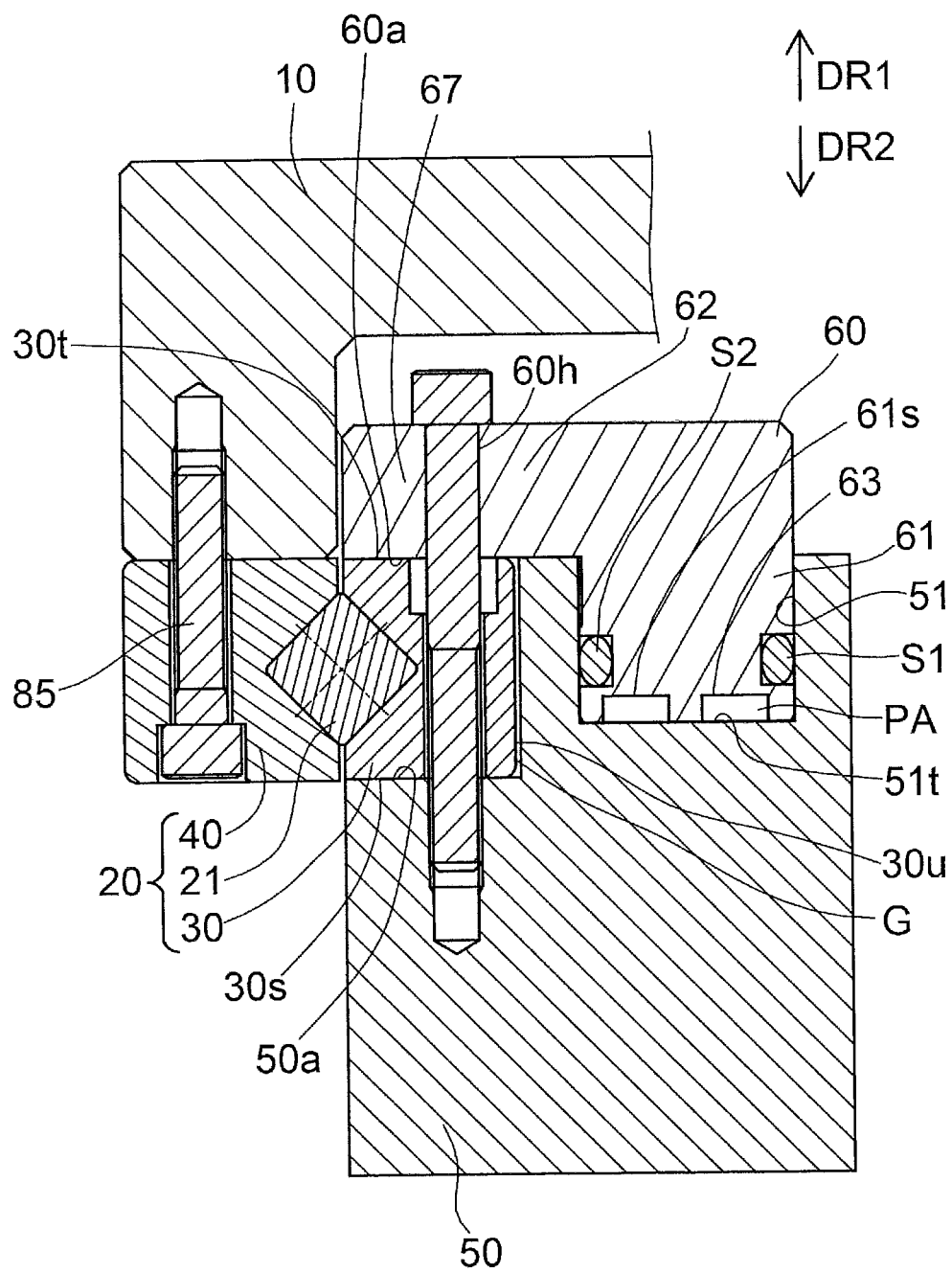
FIG. 9 is a schematic cross-sectional view of a part of the table rotation device according to the second embodiment, schematically illustrating the part of the table rotation device.
Figure 10:
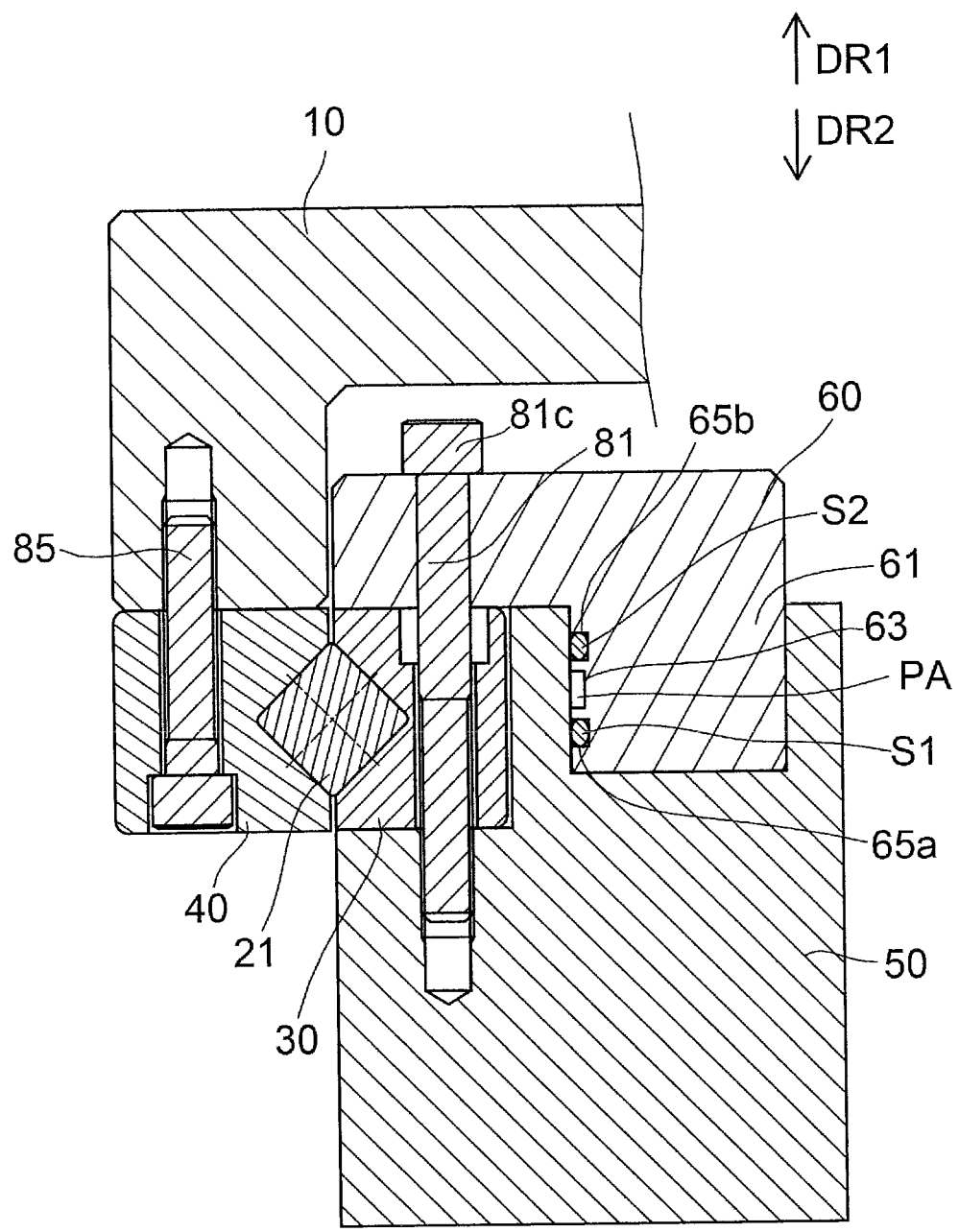
FIG. 10 is a schematic cross-sectional view of a part of a table rotation device according to a first modification of the second embodiment, schematically illustrating the part of the table rotation device.

A table rotation device 1B according to the second embodiment will be described by referring to FIGS. 8 to 10. FIG. 8 is a schematic cross-sectional view of the table rotation device 1B according to the second embodiment, schematically illustrating the table rotation device 1B. FIG. 9 is a schematic cross-sectional view of a part of the table rotation device 1B according to the second embodiment, schematically illustrating the part of the table rotation device 1B. FIG. 10 is a schematic cross-sectional view of a part of the table rotation device 1B according to a first modification of the second embodiment, schematically illustrating the part of the table rotation device 1B.

The following description of the second embodiment will mainly focus on those respects in which the second embodiment is different from the first embodiment. That is, the following description of the second embodiment will avoid repetition of description of those respects already described in the first embodiment. Thus, it will be readily appreciated that those respects that are not explicitly described in the second embodiment but are described in the first embodiment apply in the second embodiment.

In the table rotation device 1A according to the first embodiment, the fixed ring 30 is an outer ring (outer ring), and the movable ring 40 is an inner ring (inner ring). In contrast, as illustrated in FIG. 8, in the table rotation device 1B according to the second embodiment, the fixed ring 30 is an inner ring (inner ring) provided inside the movable ring 40, and the movable ring 40 is an outer ring (outer ring) provided outside the fixed ring 30.

As illustrated in FIG. 8, the table rotation device 1B according to the second embodiment includes the cooling block 60, which defines at least a part of the cooling passage PA, through which a coolant is passable. The cooling block 60 is fixed to the fixed ring 30 or the support block 50 such that the cooling block 60 is in contact with both the fixed ring 30 and the support block 50. With this configuration, the table rotation device 1B according to the second embodiment provides the same effects as the effects provided by the table rotation device 1A according to the first embodiment.

Description will be further made with regard to those respects in which the table rotation device 1B according to the second embodiment and the table rotation device 1A according to the first embodiment are different from each other.

In the example illustrated in FIG. 2, the gap G between the circumferential surface 30$u$ of the fixed ring 30 and the support block 50 is a gap between the outer circumferential surface of the fixed ring 30 and the inner circumferential surface of the support block 50. In contrast, in the example illustrated in FIG. 9, the gap G between the circumferential surface 30$u$ (in other words, the annular side surface) of the fixed ring 30 and the support block 5 is a gap between the inner circumferential surface of the fixed ring 30 and the outer circumferential surface of the support block 50.

When the gap G is formed between the circumferential surface 30$u$ of the fixed ring 30 and the support block 50, the gap G functions as a buffer that, when the bearing assembly 20 thermally expands, receives the expanded portion. This configuration prevents a seizure from occurring in the bearing assembly 20, which can occur if there were thermal expansion of the bearing assembly 20. If the thermal expansion of the fixed ring 30 is sufficiently inhibited, the gap G may not necessarily be formed between the circumferential surface 30$u$ of the fixed ring 30 and the support block 50.

In the example illustrated in FIG. 3, the inner circumferential surface of the first portion 61 of the cooling block 60 defines a part of the cooling passage PA. Also, the first O-ring S1 is provided in the first annular groove 65$a$ formed in the inner circumferential surface of the first portion 61, and the second O-ring S2 is provided in the second annular groove 65$b$ formed in the inner circumferential surface of the first portion 61. In contrast, in the example illustrated in FIG. 10, the outer circumferential surface of the first portion 61 of the cooling block 60 defines a part of the cooling passage PA. Also, the first O-ring S1 is provided in the first annular groove 65$a$ formed in the outer circumferential surface of the first portion 61, and the second O-ring S2 is provided in the second annular groove 65$b$ formed in the outer circumferential surface of the first portion 61.

Third Embodiment

Figure 11:
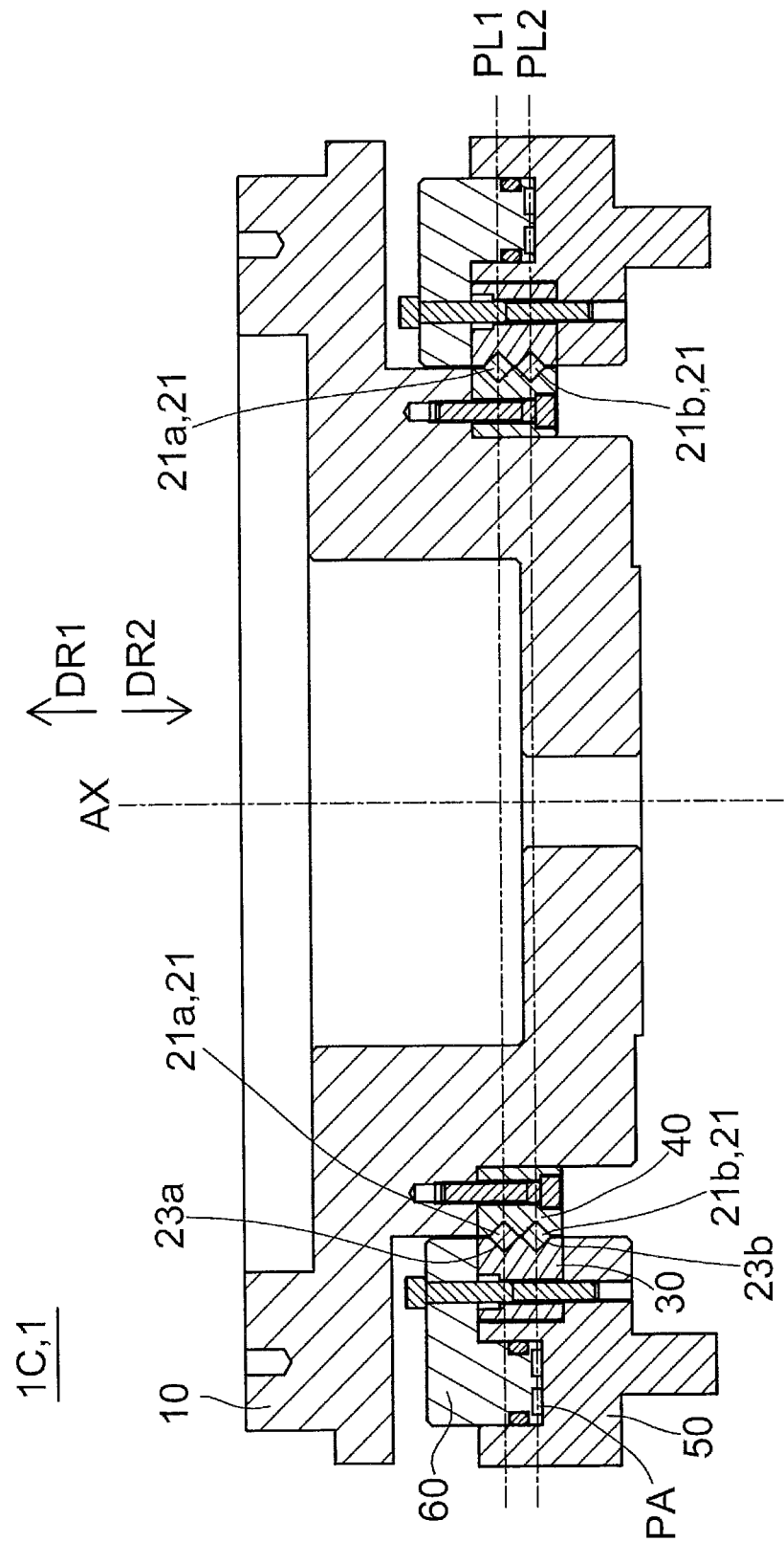
FIG. 11 is a schematic cross-sectional view of a table rotation device according to a third embodiment, schematically illustrating the table rotation device.
Figure 12:
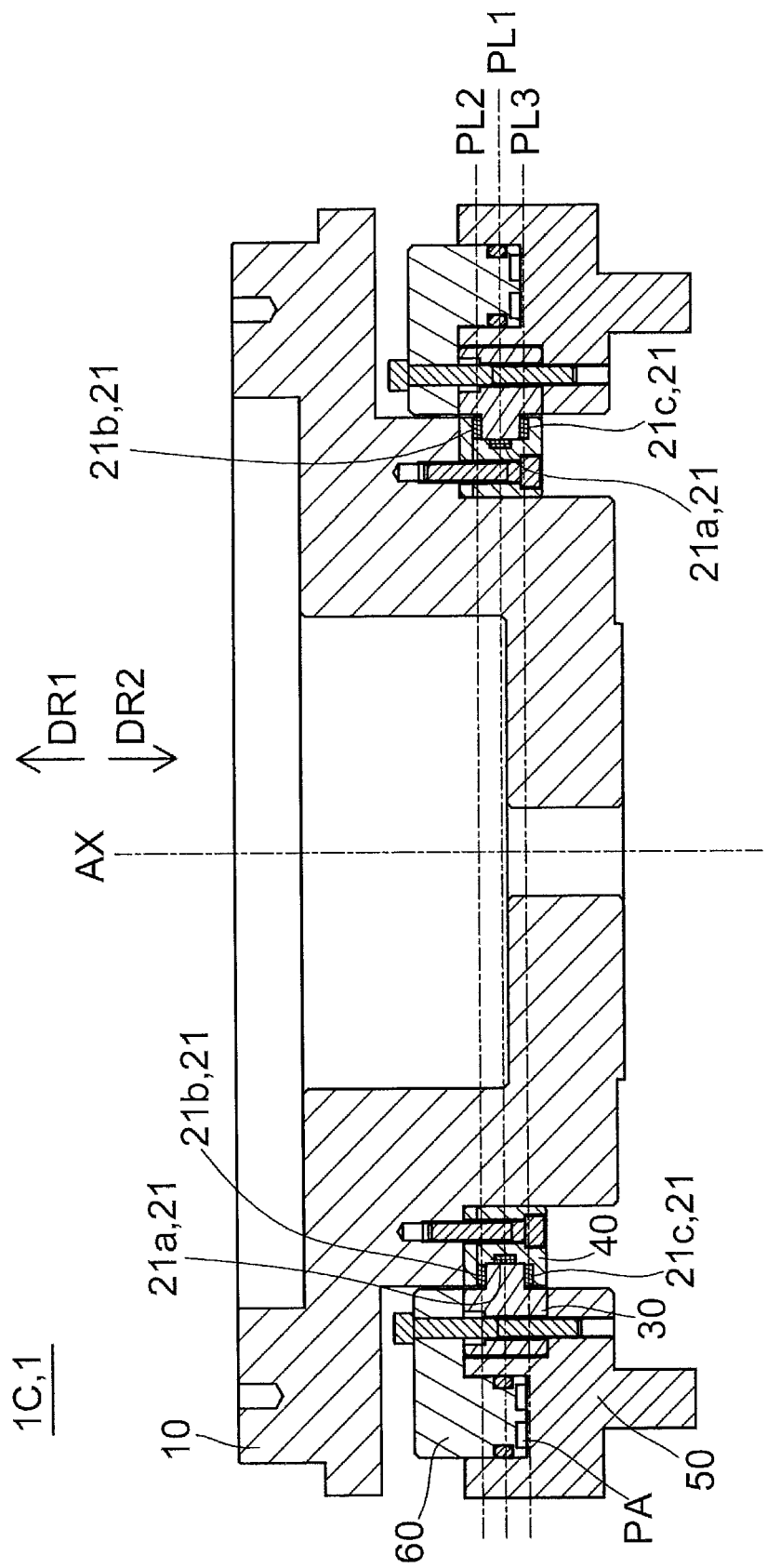
FIG. 12 is a schematic cross-sectional view of a table rotation device according to a first modification of a third embodiment, schematically illustrating the table rotation device.
Figure 13:
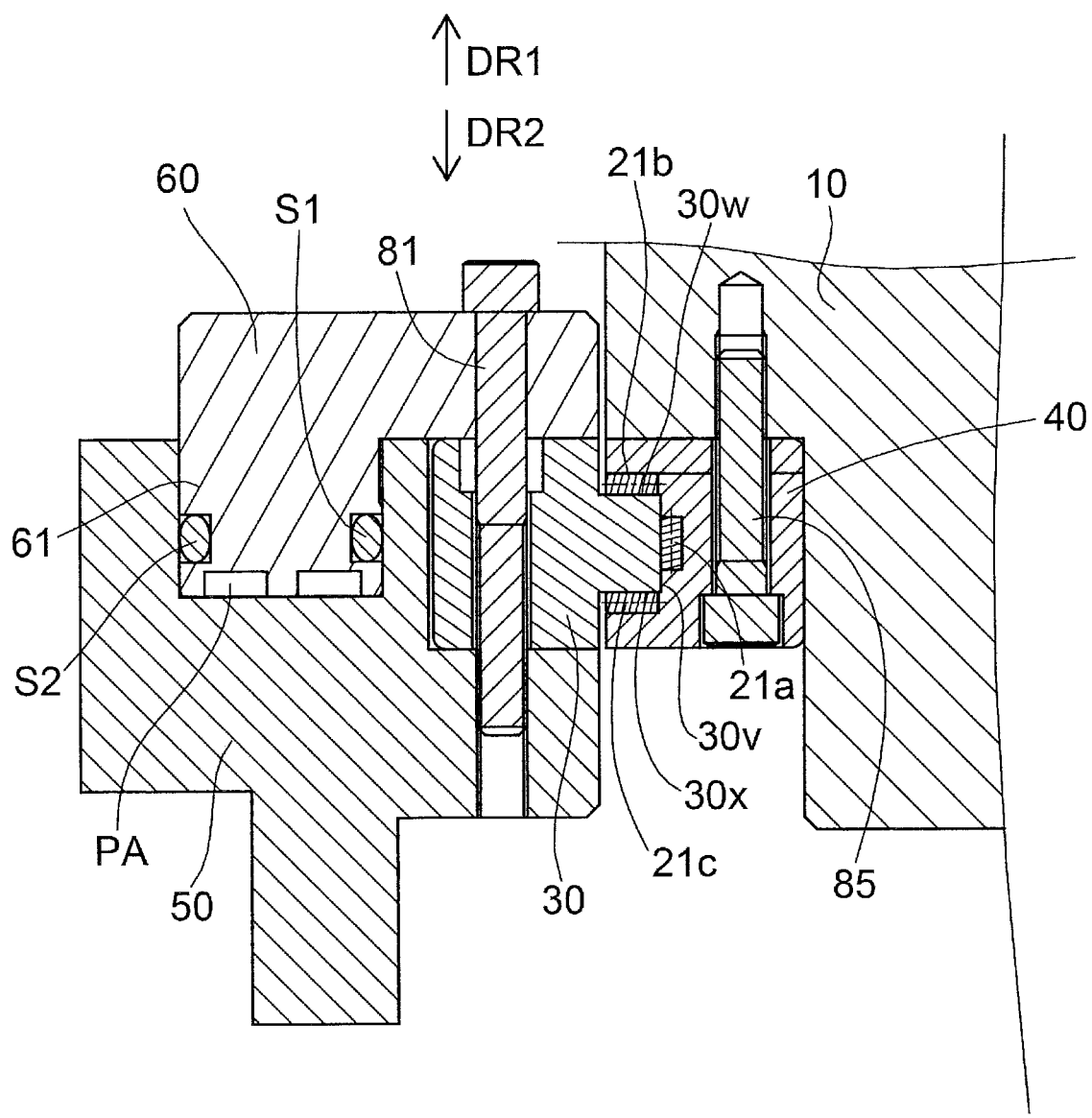
FIG. 13 is a schematic cross-sectional view of a part of a table rotation device according to the first modification of the third embodiment, schematically illustrating the part of the table rotation device.

A table rotation device 1C according to the third embodiment will be described by referring to FIGS. 11 and 12. FIG. 11 is a schematic cross-sectional view of the table rotation device 1C according to the third embodiment, schematically illustrating table rotation device 1C. FIG. 12 is a schematic cross-sectional view of the table rotation device 1C according to a first modification of the third embodiment, schematically illustrating the table rotation device 1C. FIG. 13 is a schematic cross-sectional view of a part of the table rotation device 1C according to the first modification of the third embodiment, schematically illustrating the part of the table rotation device 1C.

The following description of the third embodiment will mainly focus on those respects in which the third embodiment is different from the first embodiment and the second embodiment. That is, the following description of the third embodiment will avoid repetition of description of those respects already described in the first embodiment or the second embodiment. Thus, it will be readily appreciated that those respects that are not explicitly described in the third embodiment but are described in the first embodiment or the second embodiment apply in the third embodiment.

In the example illustrated in FIG. 1 or 8, the plurality of rolling elements 21 are provided along a single plane perpendicular to the rotation axis AX. In contrast, in the table rotation device 1C according to the third embodiment, the plurality of rolling elements 21 are provided along a plurality of planes perpendicular to the rotation axis AX.

In the example illustrated in FIG. 11, a first set of the plurality of rolling elements 21a is provided along a first plane PL1, which is perpendicular to the rotation axis AX; and a second set of the plurality of rolling elements 21b is provided along the second plane PL2, which is perpendicular to the rotation axis AX (the second plane PL2 is a plane different from the first plane PL1).

The bearing assembly 20 also includes: a plurality of first receiving portions 23a, which are for receiving the first set of the plurality of rolling elements 21a; and a plurality of second receiving portions 23b, which are for receiving the second set of the plurality of rolling element 21b.

In the example illustrated in FIG. 12 (the first modification of the third embodiment), the first set of the plurality of rolling elements 21a are provided along the first plane PL1, which is perpendicular to the rotation axis AX; the second set of the plurality of rolling elements 21b are provided along the second plane PL2, which is perpendicular to the rotation axis AX (the second plane PL2 is a plane different from the first plane PL1); and a third set of the plurality of rolling elements 21c are provided along a third plane PL3, which is perpendicular to the rotation axis AX (the third plane PL3 is a plane different from the first plane PL1 and the second plane PL2).

In the example illustrated in FIG. 13, the first set of the plurality of rolling elements 21a are provided to contact a side surface 30v (more specifically, the annular inner circumferential surface) of the fixed ring 30; the second set of the plurality of rolling elements 21b are provided to contact an upper surface 30w of the fixed ring 30; and the third set of the plurality of rolling elements 21c are provided to contact a lower surface 30x of the fixed ring 30.

The table rotation device 1C according to the third embodiment provides the same effects as the effects provided by the table rotation device 1A according to the first embodiment or the table rotation device 1B according to the second embodiment. Also in the third embodiment, the plurality of rolling elements 21 (for example, a plurality of rollers) are provided along a plurality of planes perpendicular to the rotation axis AX. When the plurality of rolling elements 21 are provided along a plurality of planes perpendicular to the rotation axis AX, the rigidity of the bearing assembly 20 is increased as compared with the case where the plurality of rolling elements 21 are provided along a single plane perpendicular to the rotation axis AX.

When the plurality of rolling elements 21 are provided along a plurality of planes perpendicular to the rotation axis AX, there is a disadvantage of an increased degree of frictional heat generated in the bearing assembly 20. This disadvantage is effectively overcome by the cooling mechanism employed in the third embodiment (more specifically, the cooling mechanism in which the cooling block 60, which defines at least a part of the cooling passage PA, is provided such that the cooling block 60 is in contact with both the fixed ring 30 and the support block 50).

It is to be noted that the configuration associated with the rolling elements 21 in the third embodiment (more specifically, the configuration in which the plurality of rolling elements 21 are provided along a plurality of planes perpendicular to the rotation axis AX) may be employed in the first embodiment or the second embodiment.

Fourth Embodiment

A table rotation device 1D according to the fourth embodiment will be described by referring to FIG. 14. FIG. 14 is a schematic cross-sectional view of the table rotation device 1D according to the fourth embodiment, schematically illustrating the table rotation device 1D.

The table rotation device 1D according to the fourth embodiment is different from the table rotation device 1A according to the first embodiment in that the table rotation device 1D includes a table 13, on which a workpiece is placed. In other respects, the table rotation device 1D according to the fourth embodiment is the same as the table rotation device 1A according to the first embodiment.

In the example illustrated in FIG. 14, the table 13 is fixed to the table support member 10. The table rotation device 1D preferably includes a fastening member 14 (for example, a bolt), which fixes the table 13 and the table support member 10 to each other. In the example illustrated in FIG. 14, the table 13 and the table support member 10 are fixed to each other by inserting the fastening member 14 into a through hole 13h, which is provided in the table 13, and into a hole 11h (more specifically, a screw hole), which is provided in the table support member 10.

The configuration in which the table rotation device includes the table 13, which is fixed to the table support member 10, may be employed in the table rotation device 1A according to the first embodiment, the table rotation device 1B according to the second embodiment, or the table rotation device 1C according to the third embodiment.

Alternatively, the table rotation device 1D may be a device in a state before the table 13 is attached to the table support member 10. In other words, the table rotation device 1D provided with the table support member 10 and the table 13 may be provided separately. In this case, after the table rotation device 1D and the table 13 are provided, the table 13 is attached to the table rotation device 1D.

Fifth Embodiment

Figure 15:
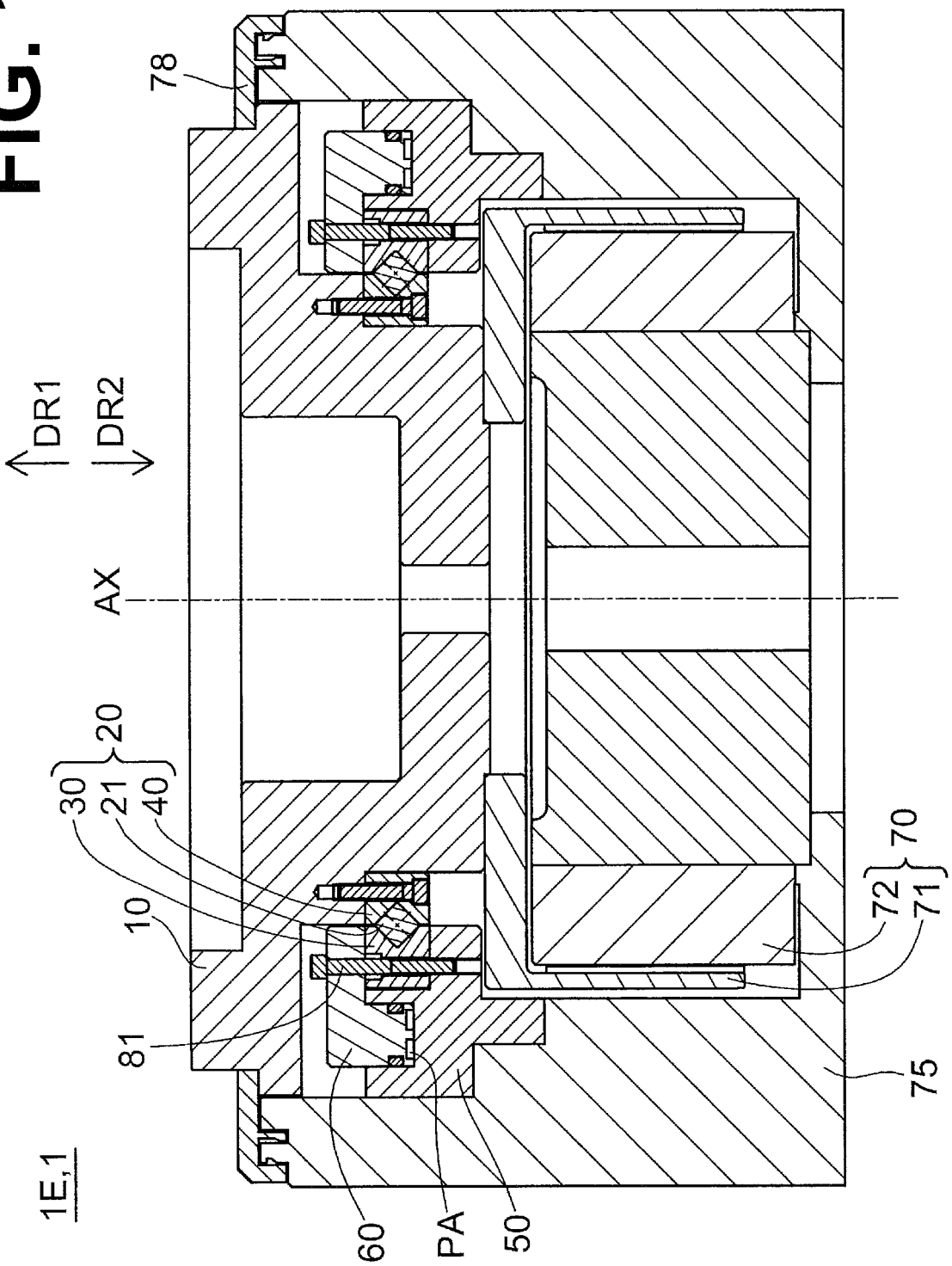
FIG. 15 is a schematic cross-sectional view of a table rotation device according to a fifth embodiment, schematically illustrating the table rotation device.

A table rotation device 1E according to the fifth embodiment will be described by referring to FIG. 15. FIG. 15 is a schematic cross-sectional view of the table rotation device 1E according to the fifth embodiment, schematically illustrating the table rotation device 1E.

In the example illustrated in FIG. 15, the table rotation device 1E additionally includes: a first driver 70, which rotates the table support member 10 about the rotation axis AX; and a frame 75, which supports the support block 50.

In the example illustrated in FIG. 15, the first driver 70 is a motor having a rotor 71 and a stator 72. The rotor 71 includes a magnetic body, and the stator 72 includes a coil through which a current flows. In the example illustrated in FIG. 15, the table support member 10 is directly connected to the rotor 71. In other words, the table support member 10 is fixed to the rotor 71. Alternatively, the first driver 70 may be connected to the table support member 10 via a speed reducer.

In the example illustrated in FIG. 15, the rotor 71 is provided outside the stator 72 such that the rotor 71 surrounds the stator 72. Alternatively, the stator 72 may be provided outside the rotor 71.

The frame 75 may be implemented by a single part or by an assembly of a plurality of parts. In the example illustrated in FIG. 15, the support block 50 is fixed to the frame 75. Additionally, the stator 72 may be fixed to the frame 75.

The table rotation device 1E may include a cover 78, which covers an outer edge portion of the table support member 10. The cover 78 prevents dust from entering the inside of the table rotation device 1E.

The configuration of the first driver 70, which rotates the table support member 10 about the rotation axis AX, may be employed in the table rotation device 1A according to the first embodiment, the table rotation device 1B according to the second embodiment, the table rotation device 1C according to the third embodiment, or the table rotation device 1D according to the fourth embodiment.

Sixth Embodiment

A machine tool 100 according to the sixth embodiment will be described by referring to FIG. 16. 16 is a schematic perspective view of a machine tool 100 according to the sixth embodiment, schematically illustrating the machine tool 100.

The machine tool 100 includes: the table 13, on which a workpiece is placed; a table rotation device 1, which rotates the table 13; a tool holding member 102; and a second driver 104.

The table rotation device 1 may be the table rotation device (1A, 1B, 1C, 1D, 1E) according to any of the above-described embodiments, or may be another table rotation device.

As illustrated in FIGS. 1, 8, 11, 12, 14, and 15, the table rotation device 1 includes the bearing assembly 20, the table support member 10, the support block 50, and the cooling block 60. The table rotation device 1 may include the first driver 70 (see, for example, FIG. 15).

The bearing assembly 20 includes: the fixed ring 30; the movable ring 40, which is rotatable about the rotation axis AX relative to the fixed ring 30; and the rolling elements 21, which are provided between the fixed ring 30 and the movable ring 40. The table support member 10 is fixed to the movable ring 40 and supports the table 13. The first driver 70 rotates the table support member 10 about the rotation axis AX. The support block 50 is fixed to the fixed ring 30 and supports the table support member 10 rotatably about the rotation axis AX. The cooling block 60 defines at least a part of the cooling passage PA, through which the coolant is passable. Also, the cooling block 60 is fixed to the fixed ring 30 or the support block 50 such that the cooling block 60 is in contact with both the fixed ring 30 and the support block 50.

In the example illustrated in FIG. 16, the table rotation device 1 includes the frame 75, which supports the support block 50, and the frame 75 is fixed to a base 106a (that is, the base 106a of the machine tool 100). Alternatively, the frame 75 of the table rotation device 1 may be swingably (in other words, tiltably) supported by the base 106a. In this case, the swing axis (in other words, the tilt axis) of the frame 75 is, for example, an axis parallel to the horizontal direction.

Details of the elements constituting the table rotation device 1 are described in the first to fifth embodiments. In view of this, the following description will avoid repetition of description of the details of the elements constituting the table rotation device 1.

The tool holding member 102 holds a tool 103, which is for machining a workpiece. In the example illustrated in FIG. 16, the tool holding member 102 is supported by the base 106b movably relative to the base 106b (that is, the base 106b of the machine tool 100). The base 106b, which supports the tool holding member 102, may be the same base as the base 106a, which supports the table rotation device 1, or may be a base different from the base 106a, which supports the table rotation device 1.

The second driver 104 is a device that moves the tool holding member 102, more specifically, a device that moves the tool holding member 102 relative to the base 106b.

The second driver 104 may be a device capable of three dimensionally moving the tool holding member 102. In other words, the second driver 104 may be capable of: moving the tool holding member 102 in a direction along the Z axis; moving the tool holding member 102 in a direction along the X axis; and moving the tool holding member 102 in a direction along the Y axis. In the example illustrated in FIG. 16, the Y-axis is an axis along a direction parallel to the vertical direction; the Z-axis is an axis along a direction parallel to the horizontal direction; and the X-axis is an axis along a direction perpendicular to the Z-axis and the Y-axis.

The machine tool 100 may include a third driver 105, which rotates the tool holding member 102 about a second rotation axis AX2. In this case, the machine tool 100 is capable of rotating, about the second rotation axis AX2, the tool 103 held by the tool holding member 102. In this manner, the workpiece can be machined with the tool 103 rotating about the second rotation axis AX2.

The machine tool 100 according to the sixth embodiment includes the table rotation device 1, and the table rotation device 1 includes the cooling block 60, which defines at least a part of the cooling passage through which the coolant is passable. Also, the cooling block 60 is provided such that the cooling block 60 is in contact with both the fixed ring 30 and the support block 50. With this configuration, the machine tool 100 according to the sixth embodiment provides the same effects as the effects provided by the table rotation device 1 according to any one of the first to fifth embodiments. For example, in the machine tool 100 according to the sixth embodiment, thermal expansion of the fixed ring 30 is inhibited, and deviation of the thermal expansion in the fixed ring 30 is inhibited. This ensures that in the machine tool 100 according to the sixth embodiment, the table 13 can be rotated with high accuracy and/or the table 13 can be positioned with high accuracy.

In addition to the table rotation device 1, the machine tool 100 according to the sixth embodiment includes the tool holding member 102 and the second driver 104, which moves the tool holding member 102. In this case, a workpiece can be subjected to turning with high accuracy while the workpiece is rotated about the rotation axis AX using the table rotation device 1. Further, a workpiece positioned with high accuracy using the table rotation device 1 can be machined with high accuracy with the tool 103 rotating around the second rotation axis AX2.

The table rotation device 1 of the machine tool 100 may include the first fastening member 81, which fixes the support block 50 and the fixed ring 30 to each other. The cooling block 60 may be fixed to the fixed ring 30 by the first fastening member 81.

Example of Specifications of Table Rotation Device 1 or Machine Tool 100

In the table rotation device 1 (or the machine tool 100) according to an embodiment, either the fixed ring 30 or the movable ring 40 that is provided on the outer side is defined as an outer ring, and either the fixed ring 30 or the movable ring 40 that is provided on the inner side is defined as an inner ring. In the example illustrated in FIG. 1, the fixed ring 30 is the outer ring, and the movable ring 40 is the inner ring. In contrast, in the example illustrated in FIG. 8, the movable ring 40 is the outer ring, and the fixed ring 30 is the inner ring.

In the table rotation device 1 (or the machine tool 100) according to the embodiment, there is no particular limitation to the inner diameter of the outer ring. In the table rotation device 1 (or the machine tool 100) according to the embodiment, thermal expansion of the fixed ring 30 is inhibited, and deviation of the thermal expansion in the fixed ring 30 is inhibited. This ensures that the table rotation device 1 (or the machine tool 100) according to the embodiment can be used under a condition in which a large amount of load acts on the bearing assembly 20 (in other words, under a condition in which a large degree of frictional heat is generated in the bearing assembly 20). For example, the inner diameter of the outer ring of the table rotation device 1 (or the machine tool 100) may be a large inner diameter, and the table 13 may be rotated at high speed.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

The present invention will not be limited to the above-described embodiments, and it is obvious that each embodiment or each modification can be appropriately modified or changed within the scope of the technical idea of the present invention. Also, the various techniques used in each embodiment or each modification can be applied in other embodiment or other modification unless a technical contradiction occurs. Further, the optional or additional configuration(s) in each embodiment or each modification can be omitted as necessary.

What is claimed is:

1. A table rotation device comprising:
   a bearing assembly comprising:
   a fixed ring provided around a rotation axis;
   a movable ring provided coaxially with the fixed ring to face the fixed ring; and
   rolling elements provided between the fixed ring and the movable ring so that the movable ring is rotatable about the rotation axis with respect to the fixed ring;
   a table support member connected to the movable ring so as to fix a position of the table support member relative to a position of the movable ring;
   a support block connected to the fixed ring so as to fix a position of the support block relative to a position of the fixed ring; and
   a cooling block connected to at least one of the fixed ring and the support block such that the cooling block is in contact with both the fixed ring and the support block, the cooling block providing a cooling passage.

2. The table rotation device according to claim 1, wherein a first fastening member connecting the support block, the fixed ring, and the cooling block so as to fix relative positions among the support block, the fixed ring, and the cooling block.

3. The table rotation device according to claim 1, wherein the support block has a first surface in contact with the fixed ring, and the cooling block has a second surface in contact with the fixed ring, and
   wherein the fixed ring is sandwiched between the first surface of the support block and the second surface of the cooling block.

4. The table rotation device according to claim 3, wherein a gap is formed between a circumferential surface of the fixed ring and a circumferential surface of the support block.

5. The table rotation device according to claim 1, wherein the cooling passage is provided between a second plane passing through a lower end of the fixed ring and a first plane passing through an upper end of the fixed ring, the first and second planes being perpendicular to the rotation axis.

6. The table rotation device according to claim 1, wherein the cooling passage is provided between a front surface of the support block and a front surface of the cooling block.

7. The table rotation device according to claim 1,
   wherein the support block has a depression,
   wherein the cooling block has a first portion inserted in the depression and a second portion provided outside the depression, and
   wherein the first portion defines the cooling passage.

8. The table rotation device according to claim 1, further comprising:
   a first O-ring and a second O-ring which are provided between the support block and the cooling block to reduce vibration of the cooling block.

9. The table rotation device according to claim 1,
   wherein the fixed ring is provided outside the movable ring.

10. The table rotation device according to claim 1, further comprising:
    a coolant supplier configured to supply the coolant to the cooling passage; and
    a flow rate adjustor configured to adjust a flow rate of the coolant supplied to the cooling passage.

11. The table rotation device according to claim 10, further comprising:
    a temperature sensor configured to detect a temperature of the bearing assembly; and
    a controller configured to control the flow rate adjustor based on a signal received from the temperature sensor.

12. A machine tool comprising:
    a table on which a workpiece is placed;
    a tool holding member configured to hold a tool to machine the workpiece;
    a second driver configured to move the tool holding member; and
    a table rotation device configured to rotate the table and comprising:
    a bearing assembly comprising:
    a fixed ring provided around a rotation axis;
    a movable ring provided coaxially with the fixed ring to face the fixed ring; and rolling elements provided between the fixed ring and the movable ring so that the movable ring is rotatable about the rotation axis with respect to the fixed ring;

a table support member supporting the table and connected to the movable ring so as to fix a position of the table support member relative to a position of the movable ring;

a first driver configured to rotate the table support member about the rotation axis;

a support block connected to the fixed ring so as to fix a position of the support block relative to a position of the fixed ring; and a cooling block connected to at least one of the fixed ring and the support block such that the cooling block is in contact with both the fixed ring and the support block, the cooling block providing a cooling passage.

13. The machine tool according to claim 12,
wherein the table rotation device comprises a first fastening member connecting the support block, the fixed ring, and the cooling block so as to fix relative positions among the support block, the fixed ring, and the cooling block.

14. The machine tool according to claim 12,
wherein the support block has a first surface in contact with the fixed ring, and the cooling block has a second surface in contact with the fixed ring, and wherein the fixed ring is sandwiched between the first surface of the support block and the second surface of the cooling block.

15. The machine tool according to claim 12, wherein a gap is formed between a circumferential surface of the fixed ring and a circumferential surface of the support block.

16. The machine tool according to claim 12, wherein the cooling passage is provided between a second plane passing through a lower end of the fixed ring and a first plane passing through an upper end of the fixed ring, the first and second planes being perpendicular to the rotation axis.

17. The machine tool according to claim 12, wherein the cooling passage is provided between a front surface of the support block and a front surface of the cooling block.

18. The machine tool according to claim 12,
wherein the support block has a depression,
wherein the cooling block has a first portion inserted in the depression and a second portion provided outside the depression, and
wherein the first portion defines the cooling passage.

19. The machine tool according to claim 12, further comprising:
a first O-ring and a second O-ring which are provided between the support block and the cooling block to reduce vibration of the cooling block.

20. The machine tool according to claim 12,
wherein the fixed ring is provided outside the movable ring.

* * * * *